United States Patent
Durbin et al.

(10) Patent No.: US 7,190,835 B2
(45) Date of Patent: *Mar. 13, 2007

(54) CODE READER PERFORMING CODED IMAGE DECODING USING NON-DEDICATED DECODE PROCESSOR

(75) Inventors: Dennis A. Durbin, Cedar Rapids, IA (US); Jon Rasmussen, Mount Vernon, IA (US)

(73) Assignee: Intermec IP Corp., Everett, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,467

(22) Filed: Jun. 20, 1997

(65) Prior Publication Data

US 2002/0057852 A1    May 16, 2002

Related U.S. Application Data

(60) Provisional application No. 60/020,190, filed on Jun. 21, 1996.

(51) Int. Cl.
*G06K 9/18* (2006.01)
*G06K 9/22* (2006.01)
*G06K 7/10* (2006.01)

(52) U.S. Cl. .................. 382/183; 382/313; 235/470

(58) Field of Classification Search .......... 382/312, 382/232, 141, 274, 291, 294, 183, 313; 235/470, 235/462.31–462.46, 462.25, 462.26, 455, 235/472; 375/206; 710/73, 2, 52

See application file for complete search history.

(56) References Cited

U.S. PATENT DOCUMENTS

| | | | |
|---|---|---|---|
| 3,699,312 A | 10/1972 | Jones et al. | 235/462.19 |
| 4,344,152 A | 8/1982 | Laurer et al. | 711/171 |
| 4,570,057 A | 2/1986 | Chadima, Jr. et al. | 235/462.45 |
| 4,593,186 A | 6/1986 | Swartz et al. | 235/462.36 |
| 4,758,717 A | 7/1988 | Shepard et al. | 235/462.46 |

(Continued)

FOREIGN PATENT DOCUMENTS

JP    02235188 A  *  9/1990

*Primary Examiner*—Wenpeng Chen

(57) ABSTRACT

A coded image capture and decoding system includes an image capture unit and a host unit which operate to capture image data, generate a plurality of coded images, and, thereafter, to decode the plurality of coded images with a non-dedicated host processing circuitry. The system comprises an image capture unit and a host unit which may be installed together or separately in one or more physical devices. The image capture unit includes an image processor, an image buffer, an optical unit, an image buffer and an interface module. The host unit includes a host processor, conventional hardware and software functions, and an interface module. During a capture cycle, the image capture unit repeatedly captures images from a coded target. When the capture cycle is complete, the image capture unit attempts to interrupt the host unit. The host unit responds to the interrupt when it is available, receives the plurality of coded images over a communication link, and performs decode processing of the coded images. A proximity detector and proximity screening rules may be employed within the image capture unit in an attempt to prevent non-code images from being delivered to the host processor. The host processor may also operate on a composite image and/or parallel process the plurality of coded images to achieve a valid decode.

6 Claims, 20 Drawing Sheets

U.S. PATENT DOCUMENTS

| | | | |
|---|---|---|---|
| 5,017,765 A | 5/1991 | Shepard et al. | 235/462.27 |
| 5,019,699 A | 5/1991 | Koenck | 235/472.01 |
| 5,065,003 A | 11/1991 | Wakatsuki et al. | 235/472.02 |
| 5,124,538 A | 6/1992 | Lapinski et al. | 235/462.12 |
| 5,130,520 A | 7/1992 | Shepard et al. | 235/462.45 |
| 5,144,118 A * | 9/1992 | Actis et al. | 235/462.18 |
| 5,157,687 A * | 10/1992 | Tymes | 235/462.46 |
| 5,180,904 A | 1/1993 | Shepard et al. | 235/470 |
| 5,260,554 A * | 11/1993 | Grodevant | 235/462.31 |
| 5,262,628 A | 11/1993 | Shepard et al. | 235/462.36 |
| 5,278,398 A | 1/1994 | Pavlidis et al. | 235/462.12 |
| 5,321,246 A | 6/1994 | Shepard et al. | 235/462.38 |
| 5,329,104 A | 7/1994 | Ouchi et al. | 235/462.07 |
| 5,346,055 A | 9/1994 | Zierpka | 198/621.3 |
| 5,467,403 A * | 11/1995 | Fishbine et al. | 382/116 |
| 5,475,206 A * | 12/1995 | Reddersen et al. | 235/462 |
| 5,493,108 A | 2/1996 | Cherry et al. | 235/462.12 |
| 5,545,886 A * | 8/1996 | Metlitsky et al. | 235/462.42 |
| 5,548,108 A | 8/1996 | Moldskred et al. | 235/462.25 |
| 5,675,424 A * | 10/1997 | Park | 382/234 |
| 5,783,811 A * | 7/1998 | Feng et al. | 235/472 |
| 5,798,516 A * | 8/1998 | Shreesha | 235/462.42 |
| 5,818,027 A | 10/1998 | Paratore | 235/472.01 |
| 5,821,523 A | 10/1998 | Bunte et al. | 235/472.01 |
| 6,041,374 A * | 3/2000 | Postman et al. | 710/73 |

* cited by examiner

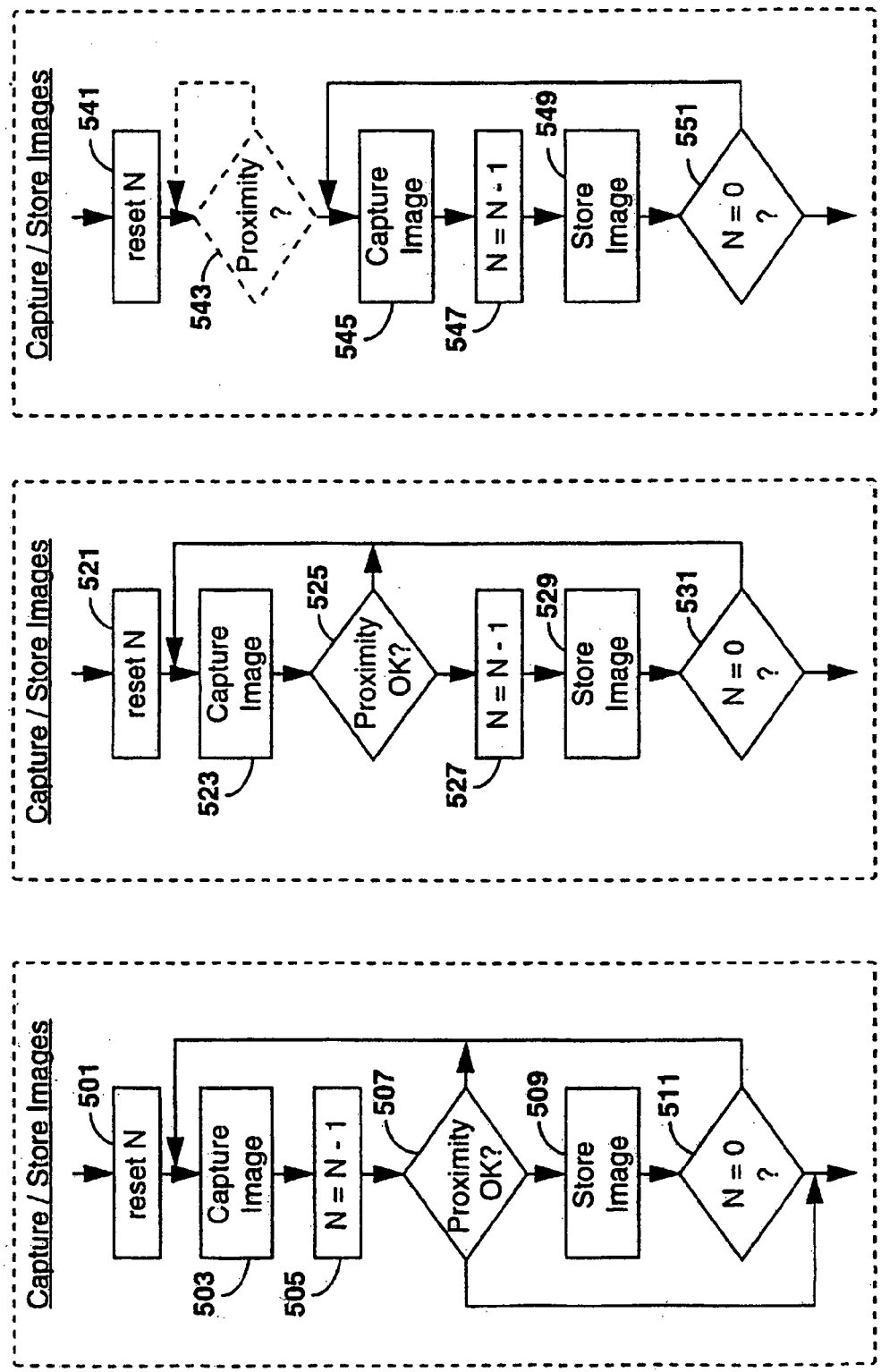

CODE READER PERFORMING CODED IMAGE DECODING USING NON-DEDICATED DECODE PROCESSOR

CROSS-REFERENCE TO RELATED APPLICATIONS

The present application claims priority pursuant to 35 U.S.C. Sec. 119(e) to U.S. Provisional application Ser. No. 60/020,190, filed Jun. 21, 1996, which is hereby incorporated herein by reference in its entirety.

BACKGROUND OF THE INVENTION

1. Technical Field of the Invention

This invention relates generally to coded image capture and decoding, and, more particularly, to a coded image capture and decoding system having capture processing circuitry for capturing a plurality of images, and having host processing circuitry which manages, among many other processing tasks, the decoding of the images. The capture processing circuitry operates to prevent the host processing circuitry from having to dedicate itself in real-time to the decode processing of incoming captured coded images from the capture processing circuitry, permitting the host processing circuitry to be shared by other hardware and/or software for performing other often real-time tasks. In addition, the capture processing circuitry functionality also permits both the host and capture processing circuitry to achieve enhanced power conservation performance.

2. Description of Related Art

As is well known, optical targets, such as a bar code label, can be found on goods or articles for tracking or accounting purposes, for example. Each of the optical targets contain coded information which either directly provides information about the good or article marked with the optical target, or indirectly provides such information with the assistance of cross-reference databases. For example, the target may only contain an alphanumeric sequence that a cross-referenced database uses to identify details regarding the good or article marked with the target such as the type of good, destination, cost, manufacturer, etc.

Conventional coded image capture and decoding systems sequentially capture images of coded optical targets, and attempt to decode each image as it is captured. If a first image is successfully decoded, the capturing process ends. Otherwise, another image is captured for a further decode attempt. Typically, this sequence continues until either a coded image is successfully decoded, or a predefined number of failed decode attempts occurs. Upon successfully decoding a coded image, the decoded data is often compared to a cross-reference database to extract further information. Such information and the decoded data are then used for specific applications such as retail checkout, package identification, tracking, shipping and accounting.

Coded targets may comprise one or two-dimensional images. A bar code label constitutes an exemplary one-dimensional coded target. Bar codes provide a robust mechanism for encoding and decoding relatively small amounts of data. Although two-dimensional coded targets typically incorporate more data than one-dimensional targets, they often prove much more difficult to decode.

Some coded image capture and decoding systems comprise both a hand-held unit and a stationary host unit. Such a configuration can be found, for example, in point-of-sale applications wherein a wand reader or low-cost, hand-held bar code reader captures and communicates coded images to a cash register host via a wired or wireless link to perform decode and subsequent processing.

In such systems, the hand-held capture unit includes optical components for assisting in the capture of coded images. For example, the optical components in a typical wand comprises a laser diode and a phototransistor detector. In a laser scanning reader, the optical assembly might also comprise scanning motors, mirrors and lens assemblies. Similarly, for continuous or flash type readers, the optical components might comprise photodetector arrays, lens systems, mirrors and flash or LED (light emitting diode) light sources. In addition, the hand-held capture units of such systems typically contain image processing and interface circuitry for communicating each coded image to the stationary host unit for attempts at decode processing.

Other coded image capture and decoding systems comprise battery powered portable units and include both coded image capture and decode functionality. In addition to performing capture and decode functionality, such portable units often perform tracking, inventory, data processing, communication functions, etc. Typically, the portable units require a high performance host processor that performs the image decoding functions as well as other hardware and software functions. The high performance host processor, as well as the associated support circuitry, consumes significant power during its operation and quickly drains the battery powering a portable unit. Some portable units that capture and decode two-dimensional codes also require high power consuming digital signal processors for decoding functions, causing the units to have limited battery life.

In operation of such systems, a read cycle is typically initiated by pushing a button, pulling a trigger or through proximity detection of a coded image within reading range. Upon initiation of a read cycle, the system delivers light, such as a scanned laser beam, LED or xenon flash, for example, to a coded target. A photodetector means of the system receives reflections from the coded target, capturing the reflected image (hereinafter a "coded image"). Interface circuitry delivers the coded image from the photodetector to a waiting host processor. Typical photodetector means include a single or plural phototransistors or phototransistor (CCD) arrays, for example.

The capturing of a coded image often occurs at a relatively slow rate in relation to typical host processor execution times. For example, laser type scanning systems scan a laser beam across a coded target at relatively slow scan rate to provide sufficient exposure time for photodetector sensing. Optical units that include an array of photosensitive elements typically require relatively long exposure times, and slowly produce image data sequentially after a target is read. Optical units also often include lenses that must be adjusted to focus on the target to capture valid image. Lens adjustments also occur relatively slowly. Because coded images are produced no faster than the rate the image data is received, coded images are typically transmitted to the host processor at a much slower rate than the fastest decode rate achievable by the host processor.

Thus, the host processor in conventional systems remains in a dedicated mode waiting for then attempting to decode each image as it is captured until one of the images is successfully decoded. During this time, the host processor is not able to conduct other types of processing or enter a worthwhile power saving state. Because some other types of processing often require real time dedication as well, additional dedicated processors or processing circuitry often proves necessary even though cost and power consumption increase.

Thus there is a need in the art for a reduced power, coded image capture and decoding system that solves the foregoing and other problems that will become apparent in view of the drawings and remainder of the specification which follows.

SUMMARY OF THE INVENTION

Along with many other advantages and benefits, in order to overcome at least many of the limitations of the prior art systems, a coded image capture and decoding system of the present invention captures image data upon initiation of a capture cycle, generates coded images, buffers the coded images, and decodes the coded images in a non-dedicated processing fashion when decode processing capability is available.

The system of the present invention includes an image capture unit, a host unit, and a communication link between the two. The image capture unit includes an image processor, an optical unit, an image buffer, and an interface module. The host unit includes a host processor, conventional hardware and software functions, and an interface module capable of communication with the interface module of the image capture unit. The image capture unit may physically connect to the host unit or may be separate and communicate in a wireless fashion.

In operation, upon initiation of a capture cycle the optical unit optically reads a target to produce image data. The image processor receives the image data and produces coded images. The image processor writes the coded images to the image buffer until the capture cycle is complete. Once the capture cycle is complete, the image capture unit interrupts the host unit to receive the coded images. When ready, the host unit receives the coded images from the image capture unit and decodes the coded images.

In this fashion, the coded image capture and decode system of the present invention does not require dedicated operation of the host processor thereby reducing power consumption and allowing the host processor to perform its other required functions.

Further, by separating the coded image capture function from the decoding function, a lower cost processor may be used in the image capture unit thus reducing cost and power consumption. Because the processing capability exists in the host unit, no functionality is lost.

In some configurations, images are only captured when a target is proximate to the optical unit. Images are transmitted to the host unit only when the image processor determines that the image probably constitutes a coded image. The capture cycle may be shortened if code image criteria is satisfied by the coded images already captured during the capture cycle. Similarly, the capture cycle may be extended if no code is detected in the coded images captured during the capture cycle.

A reference code image may be buffered and only code image differences are buffered thereafter to reduce storage and transmission demands. To further reduce storage requirements, signal transition data is identified and buffered.

Further aspects of the present invention will become apparent with reference to the detailed description, drawings and claims.

BRIEF DESCRIPTION OF THE DRAWINGS

FIGS. 5A–C are flow diagrams that illustrating three of the various ways in which the capture unit can be configured to perform the process identified in FIG. 4 of capturing and storing images.

DETAILED DESCRIPTION OF THE DRAWINGS

Figure 1A:
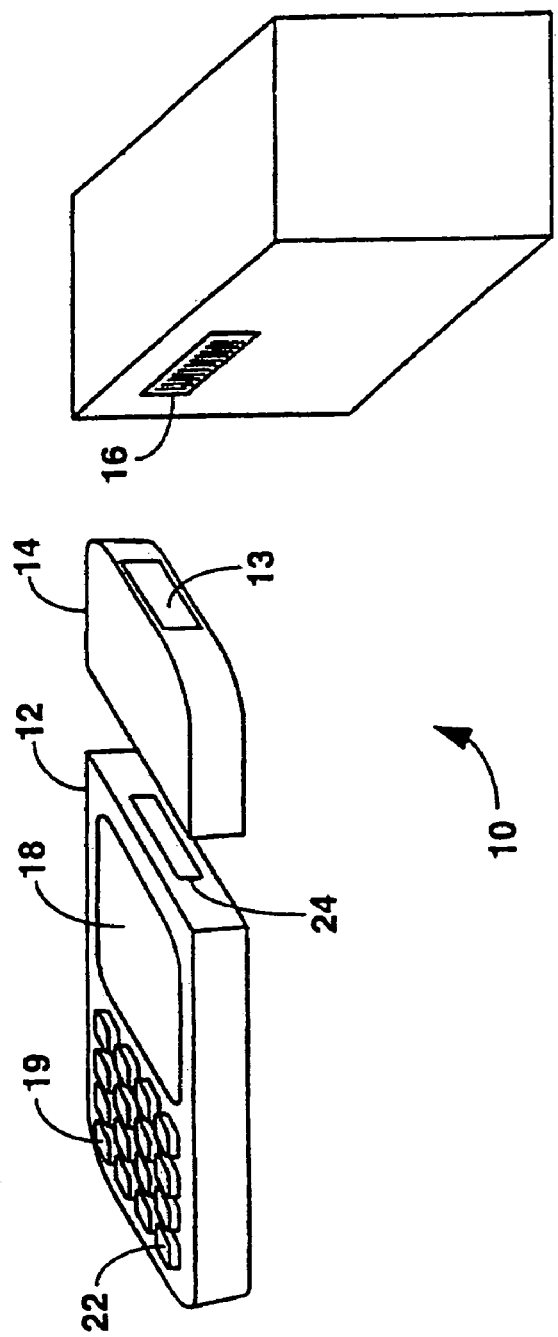
FIG. 1A is a perspective view illustrating an embodiment of a coded image capture and decoding system of the present invention having a modular assembly.

FIG. 1A illustrates a coded image capture and decoding system 10 in accordance with the present invention employed to capture and decode coded images using a two piece configuration. The coded image capture and decoding system 10 comprises a host unit 12, an image capture unit 14, and a communication link between the host unit 12 and the image capture unit 14. In a typical configuration, the host unit 12 includes processing, memory storage, interface and, possibly, wireless communication capabilities. The host unit 12 includes a display 18, a keypad interface 19, and additional components that, in addition to serving coded image reading, serve a variety of functions found in conventional hand-held computing devices. The display 18 delivers information to a user while the keypad interface 19 may be employed by a user to communicate with the host unit 12. The host unit 12 also includes an audio interface such as a speaker that relays information to the user in an audible form. The host unit 12 and image capture unit 14 are battery powered, yet may be powered by other sources as well. In addition, the host unit includes an input means such as an enable button 22 that allows a user to initiate the reading of coded targets.

The image capture unit 14 comprises image processing circuitry, an interval timer, an optical unit, an image buffer and an interface module (not shown). The image capture unit 14 can be separated from the host unit 12 to permit the host unit 12 to operate independently. The image capture unit 14 directly attaches to the host unit 12 via a connector 24. When attached, the coded image capture and decoding system 10 constitutes a single, hand-held assembly having all conventional functionality of the independent host unit 12 plus full code reading capabilities.

The image capture unit 14 captures reflected images from the target 16, applies proximity screening, stores the images and attempts to deliver the images to the host unit 12 for decode processing. While the image capture unit 14 performs such functionality, the host unit 12 may either operate on other tasks unrelated to the code reading process or wait in an idle, sleep or other low power state. Only when it is ready to perform decode processing will the host unit return its attention to the images stored in the image capture unit 14.

In particular, upon capturing a predefined number of reflected images, the image capture unit 14 stops capturing images, delivers a decode processing request to the host unit 12, starts an interval timer to approximately 0.5 seconds and enters a low power state. The host unit 12 may immediately respond to the signal else respond when other ongoing real time tasks so permit. For example, the host unit 12 may be in the middle of a wireless transmission that requires real-time servicing, and, therefore, the host unit 12 completes such servicing before responding to the image capture unit 14. When the host unit 12 does respond, the image capture unit 14 delivers the number of captured images for decode processing.

In one embodiment, the host unit 12 first constructs a composite image from the plurality of images retrieved. If decoding of the composite fails, the host unit 12 attempts to decode all of the images in parallel. In an alternate embodiment, the host unit 12 sequentially attempts to decode each image before resorting to composite image decode processing. Other combinations and ordering of sequential, parallel and composite processing may be implemented, to enhance decode processing performance, as will be described in more detail below.

If the host unit 12 achieves a successful decode, the host unit 12 delivers an indication to the user via the display 18 and a speaker (not shown). If the host unit 12 fails to achieve a successful decode from one set of captured images, the host unit 12 redirects its attention to other matters or reenters a low-power state. When the interval timer times out, the image capture unit 14 begins capturing another set of images for decode processing to repeat the cycle. This cycle repeats until the enable button 22 is released, permitting target after target to be captured and decoded. In another mode, the cycle repeats until the host unit 12 reaches a successful decode. Thereafter, the enable button 22 must be retriggered to read another target.

The time constraints of the decode processing functionality of the host unit 12 are independent of the time constraints associated with the image capture functionality of the image capture unit 14. For example, if the image capture process takes a relatively long period of time in comparison to decode processing, the host unit 12 need not dedicate itself to manage image capture or to perform decode processing on a real-time image by image basis as each image is captured. Similarly, when the image capture process takes a relatively short period of time in comparison to decode processing, the image capture unit 14 need not waste energy continuing to illuminate and capture images that may never be processed. Moreover, with multiple coded images available at a time, the host unit 12 is able to perform decode processing faster, more accurately and without the time constraints imposed on conventional decode processors of having to complete a decode attempt on one image before the next is captured.

The coded target 16 comprises a one-dimensional coded (e.g., a bar code) label. However, in other embodiments, the coded target might comprise a two-dimensional coded label. In either case, the optical unit 14 captures a plurality of reflected images from the coded target 16, buffers such images and attempts to contact the host unit 12 for decoding. The optical unit may include fixed or moveable lenses to focus the optical unit on the target 16. Reflections from the target 16 may be from illumination originating from the optical unit (in the form of a scanned laser beam, xenon flash or LED emission, for example) or may originate from ambient light.

Instead of capturing a series of non-code images and sending them to the host unit 12 to perform futile decode processing, the image capture unit 14 utilizes proximity screening to ensure that a decode attempt of a set of coded images is likely. Proximity screening involves not only the detection of any proximate object, but also involves an evaluation of the proximate object's image to determine whether the object is most likely a coded target. Although proximity screening may be turned off, such screening assists in preventing the image capture unit 14 from bothering the host unit 12 with captured non-code images. Proximity screening is carried out through an examination of, among other characteristics, the number of transitions in any given captured image. Proximity screening might alternately (or additionally) be implemented through evaluation of the magnitude of received reflections, for example.

Figure 1B:
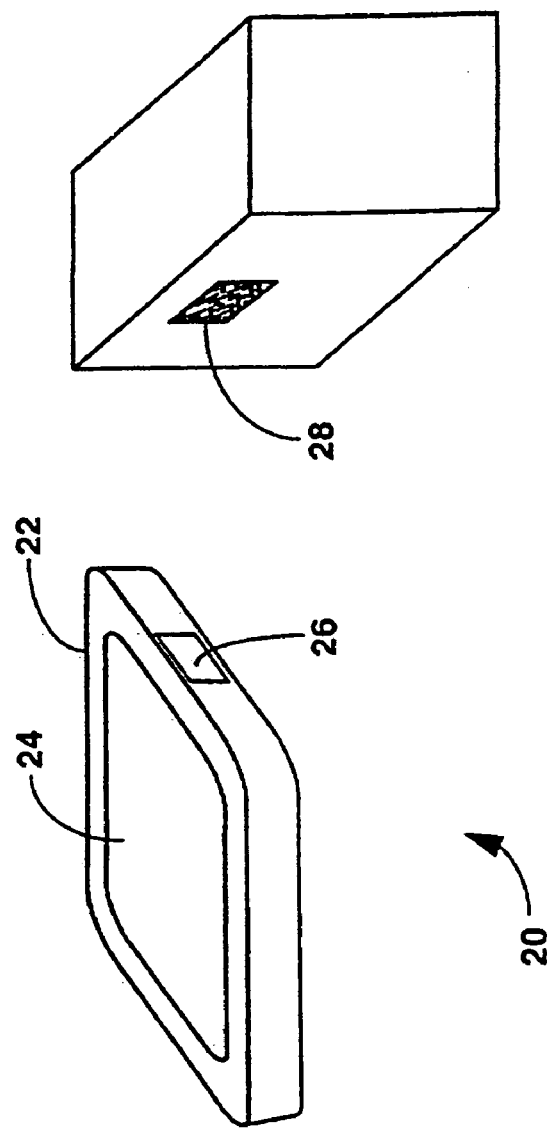
FIG. 1B is a perspective view illustrating an alternate embodiment of a coded image capture and decoding system of the present invention utilizing a one-piece tablet-sized housing.

FIG. 1B illustrates another embodiment of a coded image capture and decoding system 20 of the present invention. In the system 20, the image capture unit and the host unit are contained in a single housing 22. A touch or pen sensitive pad and display 24 receives input from a user to initiate a read cycle or to perform other functions of the host unit. Through an optical window 26, a capture unit (not shown) supports the capture of images of a coded target 28. The coded target 28 constitutes a two-dimensional code which the image capture and host units within the housing 22 are capable of reading. The associated optical unit might comprise a two-dimensional raster scanning laser system that utilizes a single photodetector for capturing reflected images over time in a line by line fashion, or, for example, could comprise a flash system using an array of photodetectors capable of capturing reflections from the entire two-dimensional coded target 28 at one time. Many other types of optical units (or "optical systems") and detecting systems may be employed.

As described previously, using proximity screening, the image capture unit of the system 20 captures and buffers a set of reflected images from the target 28. Once the images are buffered, the image capture unit sends a decode processing request to the host unit, both units being internally contained within the housing of the system 20. When the host unit decides to do so, the host unit retrieves the buffered images and performs decode processing. This process repeats until decoding proves successful.

Figure 1C:
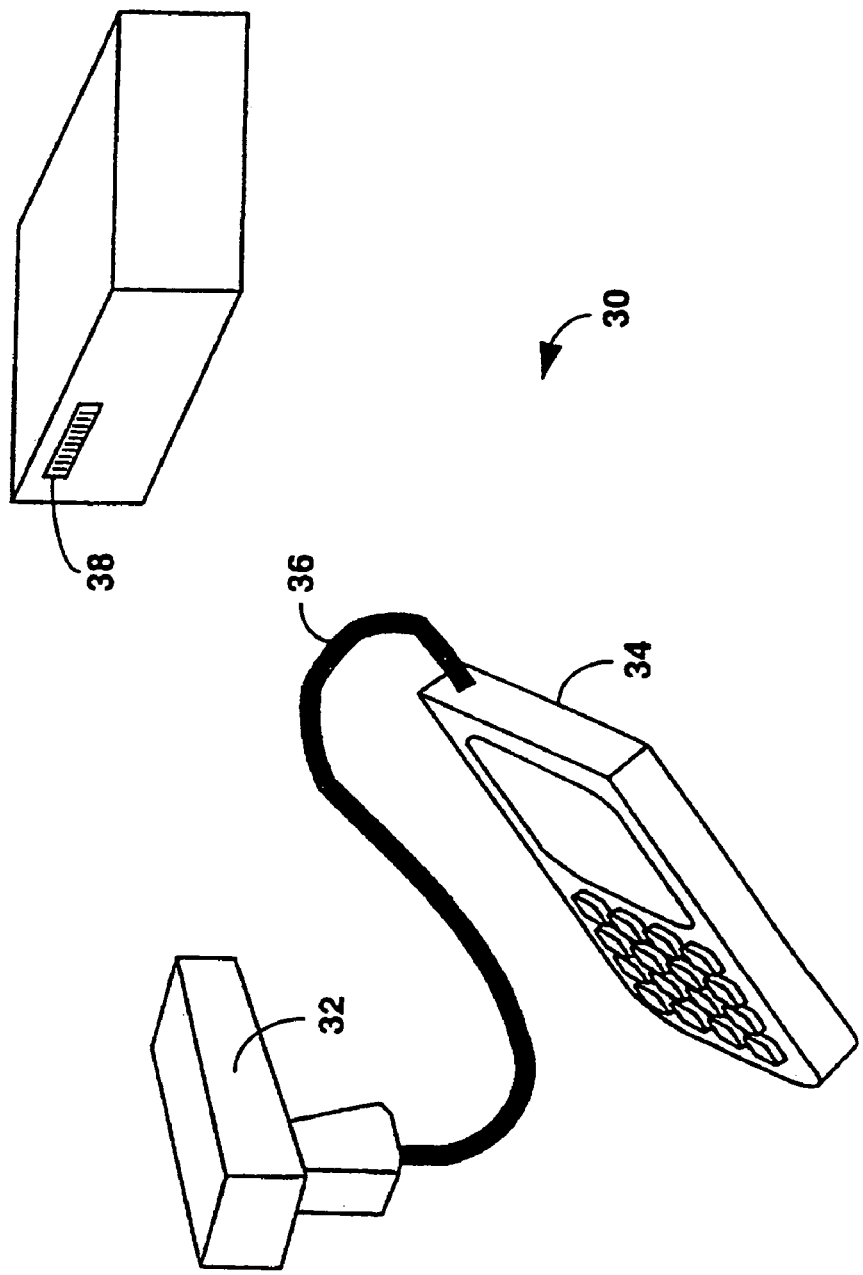
FIG. 1C is a perspective view illustrating a further embodiment of a coded image capture and decoding system of the present invention utilizing a tablet-based host computer and a tethered capture unit.

FIG. 1C illustrates another embodiment of a coded image capture and decoding system 30 of the present invention. In the system 30, the image capture unit 32 and the host unit 34 are contained in separate housings and connected by a multi-conductor cable 36. The multi-conductor cable 36 provides data transfer and control capability between the image capture unit 32 and the host unit 34. Although a battery contained in the host unit 34 powers both the host unit 34 and the image capture unit 32, the units 32 and 34 might be separately powered or a single battery might be located in the unit 32 to power the units.

The image capture unit 32 is a laser scanning hand-held unit for reading bar codes such as a bar code 38. When a user actuates a trigger 33, the image capture unit 32 begins capturing a predetermined number of reflected images, applying proximity screening rules to each image and buffering those that meet such rules. When a predetermined number of images have been captured, screened and buffered, the image capture unit 32 delivers an interrupt to the host unit 34 to indicate the need for decode processing. The host unit 34 may have masked the interrupt while performing other tasks requiring dedicated attention. If masking has not occurred or when the host unit 34 removes the mask, the host unit 34 identifies the interrupt and responds by retrieving and attempting to decode the buffered coded images. If a successful decode is accomplished, the host unit 34 emits an audible sound to notify the user that a capture and decode has occurred. At this point, the user may redirect the capture unit 32 to another coded target.

Figure 1D:
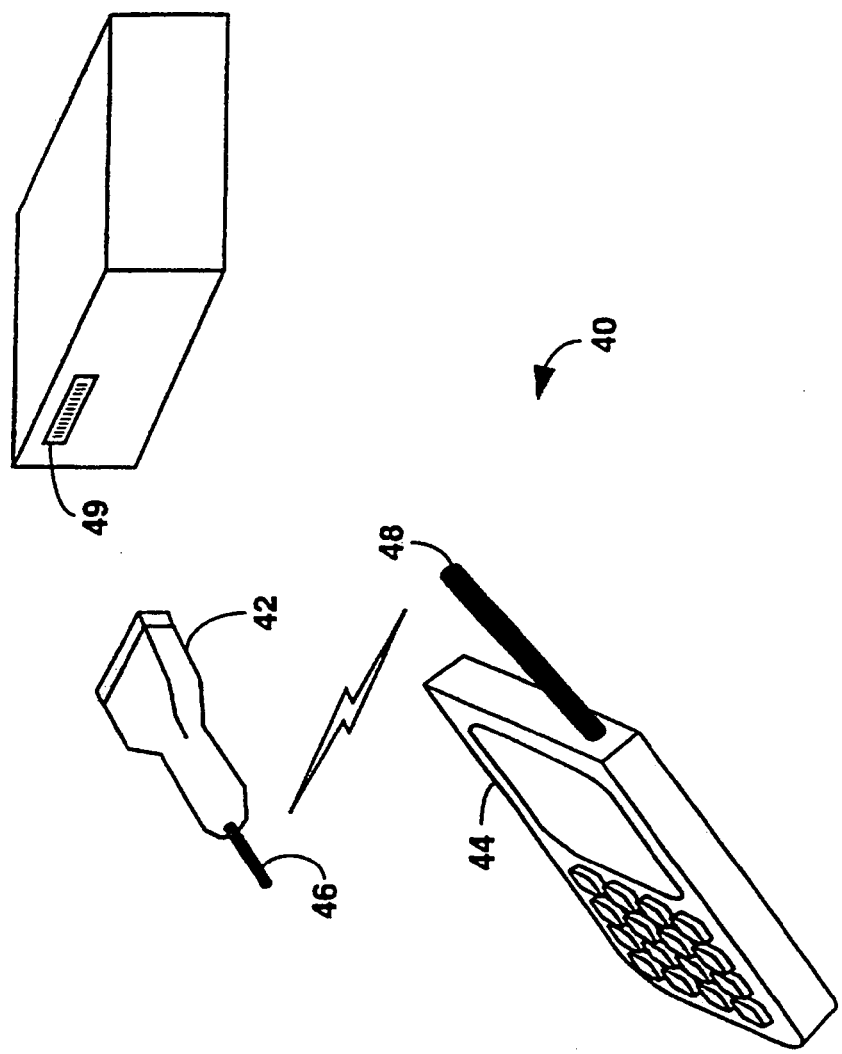
FIG. 1D is a perspective view illustrating another embodiment of a coded image capture and decoding system of the present invention having a wireless communication link between a tablet-based computer and an image capture unit.

FIG. 1D illustrates another embodiment of a coded image capture and decoding system 40 of the present invention. In the system 40, the image capture unit 42 and the host unit 44 are contained in separate housings and connected by a wireless link. The image capture unit 42 includes an antenna 46 and the host unit 44 also includes an antenna 48. Thus, the image capture unit 42 and the host unit 44 may be located remote from one another. Because the host unit 44 is located remote from the image capture unit 42, the host unit 44 could either be powered from a wall socket or by battery, and the image capture unit is battery powered.

The image capture unit 42 may be used to capture images of a bar code on a target 49, buffer the captured images, and transmit the coded images to the host unit 44 over the wireless channel for decoding. Although buffering the captured images could exist with the host unit 44, such buffering (at least initially) takes place within the capture unit 42. Thus, instead of requiring the transceiver circuitry to send each image as it is captured, the plurality of buffered images can be delivered whenever the host unit 44 is prepared to engage in decode processing. This proves especially beneficial when:1) the host unit 44 is out of range; 2) the wireless communication channel is experiencing heavy loading and/or heavy noise; and 3) the host unit 44 is using the channel to communicate with other wireless devices. In such instances, the capture unit 42 need only contend for the channel when the predetermined number of images are buffered and ready for transmission, and communicate the plurality of images when the host unit 44 is available.

Figure 1E:
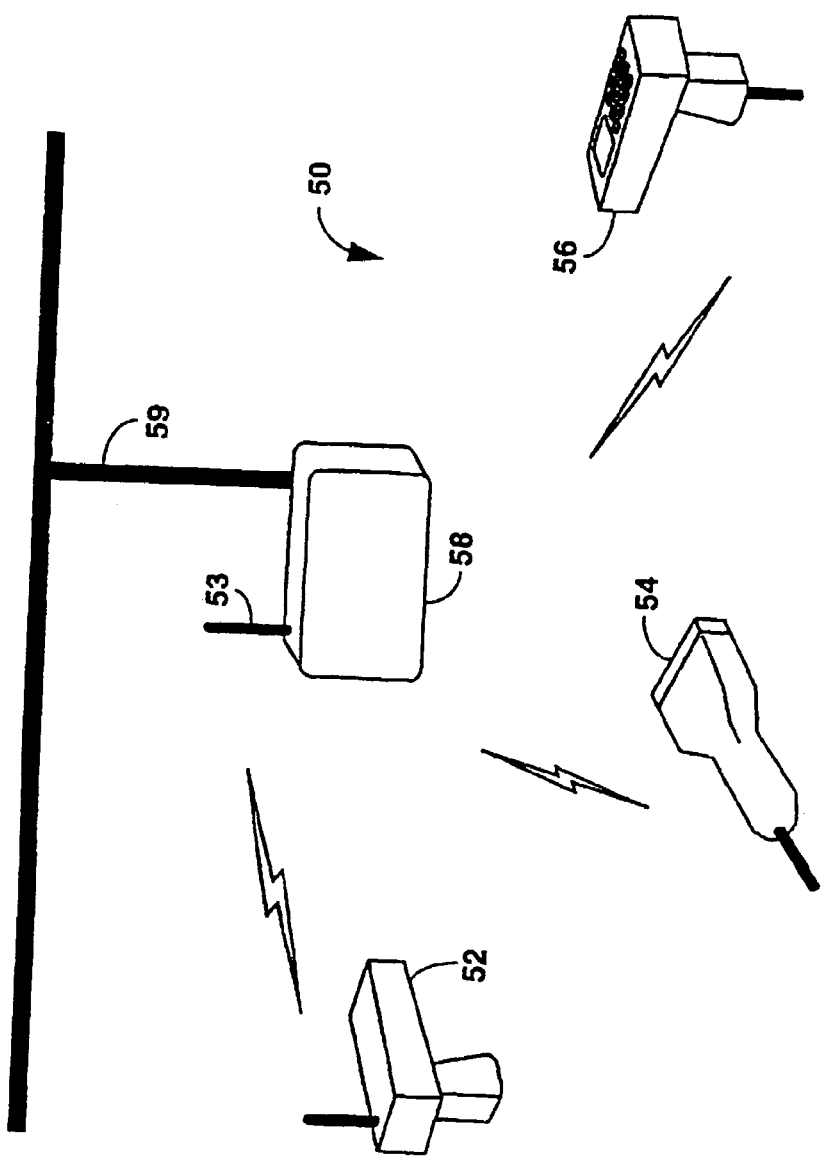
FIG. 1E is a perspective view illustrating a network embodiment of a coded image capture and decoding system of the present invention utilizing a plurality of portable capture units.

FIG. 1E illustrates another embodiment of a coded image capture and decoding system 50 of the present invention. The system 30 comprises a wireless first image capture unit 52, a wireless second image capture unit 54, a wireless combination image capture/host unit 56, a wireless access server 58 and a network 59. The first image capture unit 52 and the second image capture unit 54 each perform only image capture functions while the combination image capture/host unit 56 performs both image capture and decode functions. The wireless access server 58 includes an antenna 53 that allows wireless communication with the first and second image capture units 52 and 54 and the combined unit 56. The wireless access server 58 supports communication between the units 52, 54 and 56 and with remote processing systems and databases (not shown) on the network 59.

The wireless access server 58 includes decode processing functionality to support the units 52 and 54. Such decoding functionality might alternately (or also) be located on the network 59, for example, on a higher power computing system. Alternatively, the image capture units 52 and 54 could communicate buffered images through the wireless access server 58 to the combination capture/decoding unit 56 for decode processing.

In particular, the image capture units 52 and 54 independently begin capturing reflected images then attempt to wirelessly signal the wireless access server 58 when a predetermined number of coded images have been buffered. In response, when the wireless access server 58 is ready, the wireless access server 58 retrieves the buffered images and begins the decoding process. If the decode process proves successful, the wireless access server 58 delivers a success message, along with related data if needed, to the capture unit which sent the images. The capture unit responds by providing an indication of success to the user. If the decode process fails, the capture unit repeats the process.

Figure 1F:
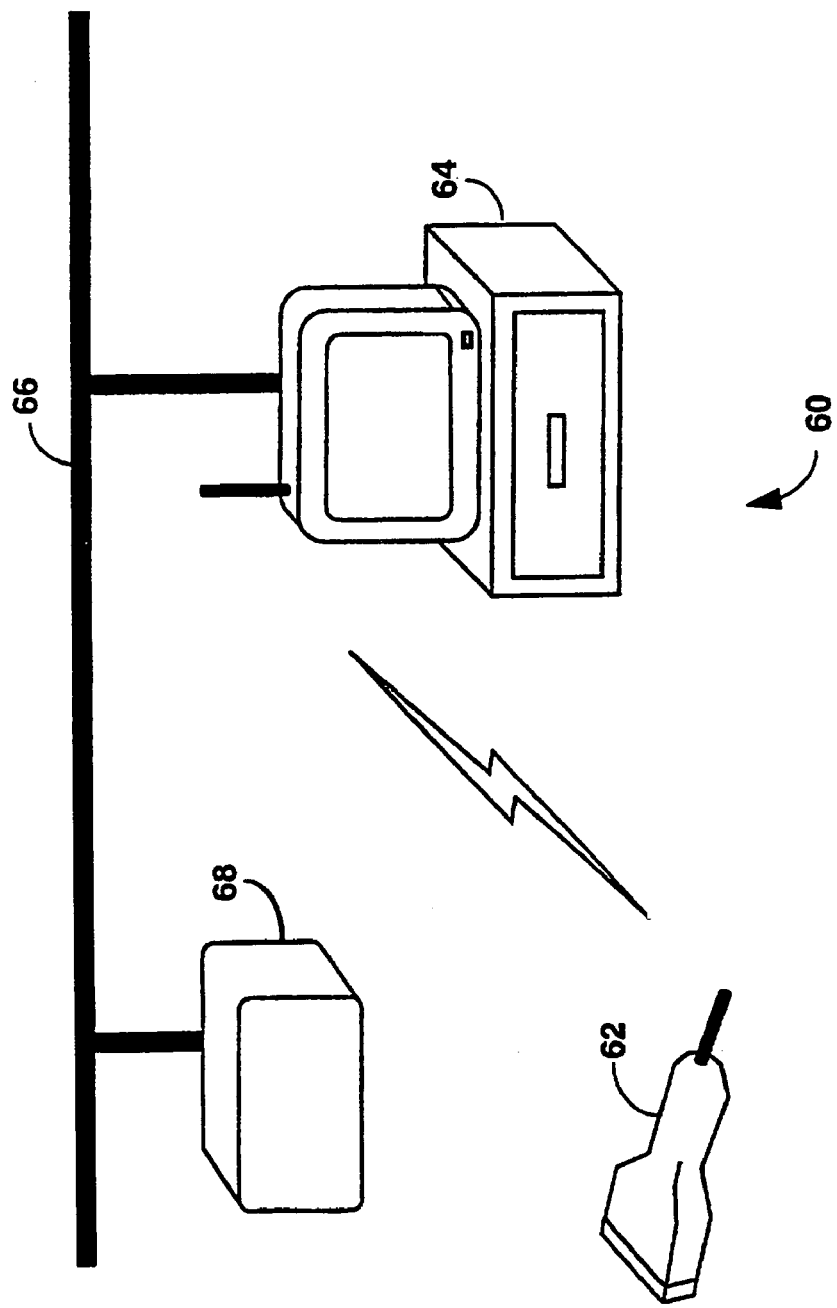
FIG. 1F is a perspective view illustrating another network embodiment of a coded image capture and decoding system of the present invention.

FIG. 1F illustrates another embodiment of a coded image capture and decoding system 60 of the present invention. The system 60 comprises a wireless image capture unit 62, a cash register 64, a data storage and processing unit 68 and a network 66. The image capture unit 62 performs image capture functions and communicates with the cash register 64 wirelessly. Of course, the unit 62 might alternatively be hard-wired to the register 64. In either case, the cash register 64 serves as the host unit 64 and performs the decode functionality. In executing the decode functionality, the cash register 64 may access the data storage and processing unit 68 over the network 66 to retrieve supplemental decode data. Alternately, the cash register 64 might deliver all image information through the network 66 to the unit 68 for decode processing if the unit 68 is so configured.

Because the cash register 64 performs other real-time functions in addition to decoding, the cash register 64 can respond when it is ready and available to the image capture unit 62 without having to dedicate itself to the unit 62. Thus, for example, if the cash register 64 is conferring with the data storage unit 68, it need not abort the effort to service the capture unit 62. Instead, the effort can be completed without having to worry about losing synchronization with the capture unit 62.

The system of FIG. 1F might be used in a retail environment wherein the image capture unit 62 scans bar codes on items to be purchased. Because decoding functions are performed by the cash register 64, the portable image capture unit 62 will be a low power, low cost unit. In a typical retail installation, a central data base of item prices will be stored in the data storage unit 68 and accessed by a plurality of cash registers (not shown).

Figure 2A:
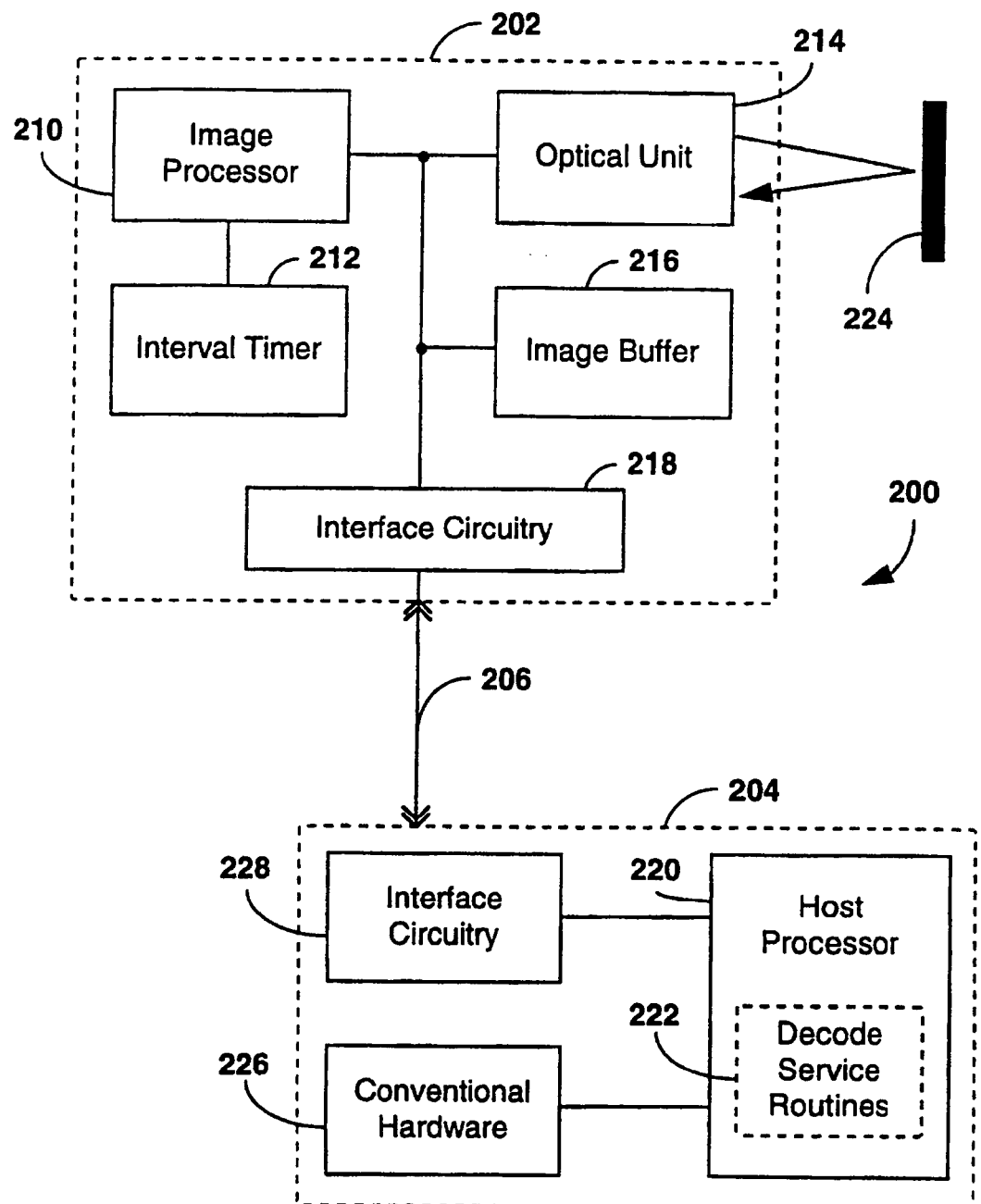
FIG. 2A is a schematic block diagram illustrating the functional operation of the coded image capture and decoding systems of FIGS. 1A–F.

FIG. 2A is a diagram illustrating a schematic block diagram illustrating an embodiment of the circuitry underlying the coded image capture and decoding systems of FIGS. 1A–F. In particular, a coded image capture and decoding system 200 comprises an image capture unit 202 and a host unit 204 coupled to one another by a communication link 206. The image capture unit 202 comprises an image processor 210, an image buffer 216, an optical unit 214, an interval timer 212 and interface circuitry 218. The host unit 204 comprises a host processor 220, conventional hardware 226 and interface circuitry 228.

The image capture unit 202 attempts to capture a plurality of coded images for batch decoding by the host unit 204. This attempt involves the optical unit 214 capturing a predetermined number of reflected images, for example five (5), and delivering each as they are captured to the image processor 210. Upon receipt, the image processor 202 applies proximity screening rules to each reflected image if this option is selected. If a reflected image fails to meet the proximity rules or if the proximity screening option is not selected, the image is rejected and not stored within the buffer 216. Otherwise, if a reflected image passes the proximity rules, the image processor 210 considers the reflected image a "coded image" and stores it in the buffer 216. After the predetermined number of reflections are captured, the image processor 210:1) resets the interval timer 212 to time out after approximately 0.5 seconds; 2) suspends the capturing of further reflected images; 3) attempts to contact the host unit 204 if two (2) or more images are stored in the image buffer 216 (i.e., "2" being a minimum threshold); and 4) places the capture unit 202 in a low-power consuming state. The predetermined number of images captured, the minimum threshold and the time out period may be adjusted to accommodate the specific hardware and coded images at issue.

In particular, after accepting or rejecting the predetermined number of reflections, if the image buffer 216 contains at least two (2) coded images, the image processor 210 attempts to notify the host unit 204 of the need to perform decode processing. Otherwise, if less than two (2) coded images are stored in the image buffer 216, the image processor 210 concludes that the stored image probably cannot be decoded and, therefore, the image processor 210 will not attempt to notify the host unit 204.

Upon time out of the interval timer 212, the image processor 210 exits the low-power consuming state and repeats the capture cycle by directing the optical unit 214 to capture of another set (the predetermined number) of reflected images, applying proximity screening, resetting the interval timer and, if justified, attempting to notify the host unit 204. Thus, at 0.5 second intervals, the capture unit 202 attempts to capture, screen and store a set of images for batch decode processing by the host unit 204.

Upon notifying the host unit 204 that a set of coded images await decode processing, the image processor 210 enters a low-power consuming state awaiting either a time out of the interval timer 212 or a communication from the host unit 204. If the interval timer 212 times out, the image processor 210 repeats the capture cycle, attempting to gather another set of coded images. However, the image processor 210 does not overwrite or erase the set of coded images stored in the image buffer 216 for which the host unit 204 was notified, until:1) an acceptable subsequent set of coded images (i.e., a set of at least two images) has been stored in the image buffer 216; 2) three (3) capture cycles or intervals have lapsed —casting away aged images; or 3) the host unit 204 retrieves that set of coded images.

Thus, for laser scanning optical units, during capture cycles, a user would typically observe a series of short periods of illumination of the coded image each separated by slightly longer periods without illumination. The illumination periods would each last approximately 0.1 to 0.2 seconds, for example, depending on the number of images that are being captured. The periods without illumination would correspond to the time out period of the interval timer 212 of approximately 0.5 seconds.

In one setup mode, the capture cycling repeats indefinitely so long as read processing is enabled, for example via the enable button 22 of FIG. 1A, whether or not a successful decode occurs. The optical unit 214 may be directed from one coded target to another without having to trigger or retrigger. During this process, the host unit 204 screens multiple decodes of the same coded target, requiring manual user intervention to accept intentionally repeated reads. Such manual intervention might be prompted and received through a display and keypad, respectively, for example. However, in another setup mode, the repeated capture cycling is only continued until the host unit 204 decodes a single set of coded images. Thereafter, the code read processing of the system 200 will remain idle until it is re-enabled, for example, through retriggering. In this mode, a user would typically observe repeated on off cycling that terminates after a coded target has been decoded.

Although in the present embodiment at least two (2) coded images must be stored in the image buffer 216 to justify a decode processing attempt by the host unit 204, more or less images may be required based on a desired level of performance in a particular environment and with a particular coded target type. Moreover, although the benefit of proximity screening of what appears to be non-code images from the host unit 204 often outweighs the additional processing required by the image processor 210, in other embodiments, such is not always the case. In such embodiments, the image processor 210 may be configured to directly store all reflected images that are captured in the image buffer 216 and always notifies the host unit 204 to perform decoding.

The image processor 202 operates via the interface circuitry 218 to coordinate delivery of the notification through the interface circuitry 228 to the host processor 220. The specific nature of such coordination depends on the specific characteristics of the communication link 206. In FIG. 1A, for example, the interface circuitry 218 and 228 may comprise UART's (Universal Asynchronous Receiver/Transmitters) for delivering the notification and coded images to the host unit 204 across a serial wired link 206. Alternatively, the link 206 might comprise a wired parallel link, for example.

Similarly, in FIGS. 1D–F, the communication link 206 constitutes a wireless link. As such, the interface circuitry 218 and 228 would comprise wireless transceivers. Moreover, although FIGS. 1A–D and 1F illustrate a communication link 206 that is dedicated to communication with a single host unit 204, FIG. 1E illustrates both that the communication link 206 may comprise many relaying elements and that the link 206 may be used by pluralities of capture units 202 to access a single host unit 204. Similarly, although (not shown) a single capture unit 202 might utilize the same communication link 206 to access ones of a plurality of host units for decode processing. Likewise, the communication link 206 could be shared to accommodate non-decode processing functionality. In such cases, the host processor 220 may not respond to an attempted notification because the attempt itself never reached the interface circuitry 228. This would occur either when access to the communication link 206 could not be achieved by the interface circuitry 218 or when the attempted communication itself failed successful delivery over the link 206.

Upon receiving a notification from the image processor 210 that coded images await decoding, the interface circuitry 228 attempts to contact the host processor 220. Although the host processor 220 might be configured to poll the interface circuitry 228 to identify incoming notifications whenever the host processor 220 becomes available, in one embodiment, the interface circuitry 228 attempts to contact the host processor 220 by delivering an interrupt to the host processor 220. In particular, when a set of coded images have been stored in the image buffer 216, the image processor 210 delivers a "decode request" byte to the interface circuitry 228 via the interface circuitry 218. In response, the interface circuitry 228 delivers an interrupt to the host processor 220.

When the host processor 220 happens to be in an idle or low-power state or is currently performing a lower-priority task, the host processor 220 will not have the interrupt masked and, therefore, will immediately respond by vectoring to execute decode service routines 222. When the host processor 220 is engaged in a task of higher-priority or which requires or significantly benefits from real-time uninterrupted attention, the host processor 220 masks the interrupt from the interface circuitry 228. When masked, the interrupt from the interface circuitry 228 is not considered by the host processor 220. However, upon removing the mask, the host processor 220 will detect the pending interrupt and immediately vector to execute the decode service routines 222. Masking permits the host processor 220 to better service conventional hardware 226 and associated software applications.

If the host unit 202 successfully decodes a set of buffered images, the host unit 202 indicates the occurrence to the user through various interface means such as a display or speaker as described above. In addition, in the continuous reading mode, the host unit 202 is configured to ignore all notifications for a period of such as 1.5 seconds after a successful decode to prevent further decode processing of the same target or an unintended target in the path between the last decoded target and the next intended target.

Proximity screening rules may be based on reflected image strength or contrast. In the present embodiment, proximity rules for a one-dimensional coded target involves the screening of reflected images based on quite zone transition timing, the number of transitions and the code length. Specifically, the image processor 210 first counts the transitions of an incoming reflected image. If the number of transitions outside of a range required to even be considered one of the coded image types that might be encountered, the reflected image is rejected. Similarly, if the length of the coded image is too long or short to be construed as one of the available coded image types, the image is rejected. Likewise, if the quiet zones leading up to the reflected image are too short to satisfy the quiet zone requirements of at least one of the code image types, the image processor 210 rejects the image. Other proximity rules might also be included. Similarly, some of these rules might be dropped. The trade-off is between image processor 210 capability and unnecessary host processor 220 attention.

The decode service routines 222 direct the host processor 220 to retrieve the set of coded images from the image buffer 216 via the interface circuitry 218 and 228 and the communication link 206. Once received, pursuant to the service routines 222, the host processor 220 performs decode processing, informs the user (via audio or display) of any decode success and returns to the task or idle condition it was in before vectoring. The host processor 220 may also inform the image capture unit 202 of success if termination of the capture process is desired (as in an alternate embodiment).

The host unit 204 includes a variety of modes of operation including full active, partially deactivated, and sleep modes. Thus, the host unit 204 may go into a sleep mode when its operation is not required. In fact, the host unit 204 may be in the sleep mode throughout a series of capture cycles wherein the target 224 is not yet in proximity. The host unit 204 is not dedicated to the decoding function. Moreover, once the coded images are received from the image capture unit 202, they may be stored in conventional memory and decoded as processing time of the host processor 220 happens to be available.

Similarly, with the present design, the capture unit 202 need not be restricted by the dedication of the host unit 204. If capturing images occurs rapidly in comparison to image delivery and decode processing times (for example with remote shared host units and/or two-dimensional image decoding), the capture unit 202 is able to enter a sleep or low power mode during the interval timer 212 time out instead of making possibly futile attempts to deliver a continuous stream of images to an unreachable or unavailable host unit for decode processing.

The sleep and/or idle times associated with the present design in both the host and capture units 204 and 202 conserve significant battery power. Similarly, power savings are also experienced in not dedicating the units 202 and 204 to servicing each other, i.e., by not requiring either of the units to wait, slow down or speed up based on the other unit's capabilities or limitations. Such power savings prove to be a significant benefit in portable applications such as is illustrated in FIGS. 1A–F.

The image buffer 216 comprises dynamic memory that may be written and overwritten as is required. The image buffer 216 could be a portion of another block of memory, such as system memory, or could be a separate structure dedicated to buffering the coded images. The image processor 210 has reduced heat generating characteristics, cost, size and power consumption as compared to a processor that performs decoding functions. Thus, the image capture unit 202 may be constructed smaller and less expensively than units that perform both image capture and decoding functions, opting to off load higher performance decoding requirements with a shared host processor.

Figure 2B:
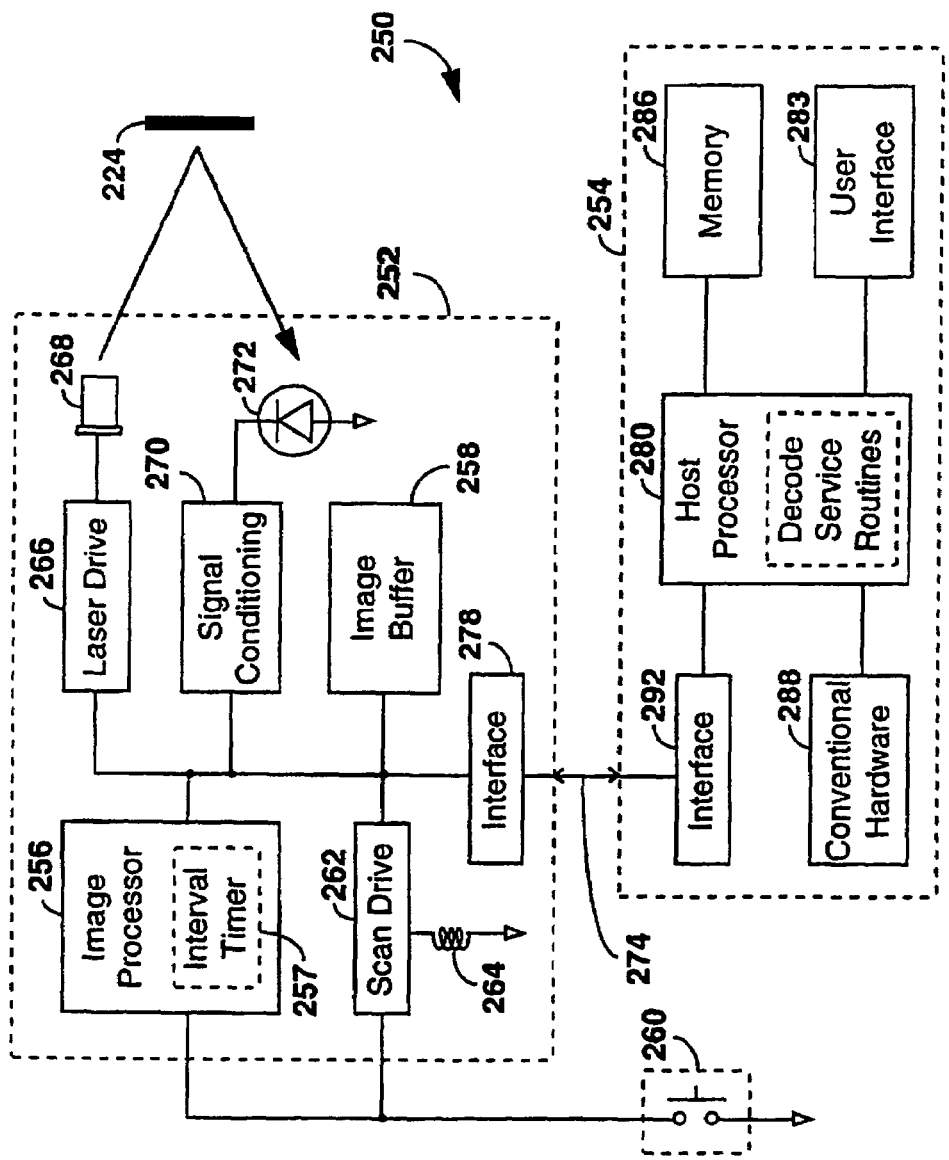
FIG. 2B is a schematic block diagram illustrating a laser scanning embodiment of the coded image capture and decoding systems of FIGS. 1A–F.

FIG. 2B illustrates an alternative embodiment of a coded image capture and decoding system of the present invention utilizing laser scanning optics. The coded image capture and decoding system 250 comprises an image capture unit 252 and a host unit 254. The image capture unit 252 comprises an image processor 256, an image buffer 258, scan drive 262, scan drive coil 264, laser drive 266, a laser light source 268, signal conditioning circuitry 270, a photodetector 272 and an interface 278. In response to a read initiate button 260

(which may be within either unit 252 or 254), the scan drive 262 sets the scanning components in motion. Also in response to the read initiate button 26, the image processor 256 coordinates with the remaining portions of the capture unit 252 to capture and deliver in sets of images to the host unit 254 for decode processing.

In particular, the image processor 256 comprises digital circuitry that is programmable to execute instructions to produce images based upon the image data received from the signal conditioning circuitry 270. The image processor 256 communicates with and controls the image buffer 258, the scan driver 212, the laser drive 266, the signal conditioning circuitry 270, and the interface 278 to perform capture cycling. Thus, communication and control between the image processor 256 and the other elements within the image capture unit 202 comprises communication links that facilitate the requisite control functions and transfer of data. Such communication links include data, address and control busses and lines as required.

The image buffer 258 is coupled to the image processor 256 and the host processor 280 and comprises data storage that may be used to store the plurality of images. The image buffer 258 comprises conventional memory connected to the image processor 256, but might alternately comprise memory contained within the image processor 256 itself.

The host unit 254 comprises a host processor 280, a user interface 283, memory 286, conventional hardware 288 and an interface 292 that couples the host processor 280 to the capture unit 252 over a communication link 274. The communication link 274 could be a wired or wireless and shared or dedicated depending upon the installation. For example, consistent with the construction of the system 10 of FIG. 1A, the communication link 274 comprises a serial link that provides a relatively high-speed, dedicated data path between the image capture unit 252 and the host unit 254.

Typical conventional hardware 288 might include monitoring circuitry, wireless transceivers, wired modems, speech recognition and synthesis circuitry, etc., that may benefit from real-time dedication by the host unit 254. Typically, the host processor 280 communicates with other elements via control, data and address lines or busses in order to function with the elements within the host unit 254. Of course, depending upon the functionality of the respective element and the communication and control bandwidth required, the links between the elements within the host unit with vary.

In FIG. 1A, the user interface 283 comprises a separate keypad and display and audio circuitry. In FIG. 1B, the keypad and display are combined in the user interface 283. Other combinations and variations of user interface components and circuitry are commonly known and might also or alternately be employed.

Prior to initiation of the capture cycle, the components of the image capture unit 252 are in a low power mode to conserve battery life. A depression of the read initiate button 260 signals the image processor 256 and scan drive 262 to begin capture cycling. In response, the scan drive 262 drives the scan drive coil 164 to cause movement of the optical components that cause the scanning of the laser light that is emitted from the laser diode 268. For example, in some embodiments, the scan drive coil 164 oscillates one or more mirrors placed in the outgoing path of the laser beam from the laser diode 268. In others, the scan drive coil 164 rotates a hexagonal scanning mirror. Instead of oscillating or rotating mirrors, the scan drive coil 164 oscillates the laser diode 268 itself in yet other embodiments.

Also responding to the initiate button 260, the image processor 256 brings the remaining circuitry in the capture unit 252 out of the low power state to conduct the capture cycling. Afterwards, the image processor 256 coordinates and synchronizes the activity of the laser diode 268 via the laser drive 266 and the photodetector 272 via the signal conditioning circuitry 270 with the scan drive 262 to begin capturing reflected images. The image processor 256 processes the captured images using proximity screening and stores the screened images in the image buffer 258.

The read initiate button 260 directly controls operation of the scan drive coil 264 via the scan drive 262. In doing so, energy is often saved in that the oscillation or rotation caused by the coil 264 by maintaining ongoing oscillation or rotation, rather than terminating such movement immediately after a capture cycle has ended. Thus, during capture cycling, including the intervals that the laser diode 268 is turned off, the scan drive coil 278 will continue to cause oscillation, rotation or other motion. Only when the read initiate button 260 is released will the scan drive 262 stop driving the scan coil 264.

The read control button 260 also directly notifies the image processor 256 that capture cycling is desired. The image processor 256 responds by controlling the laser drive 266, signal conditioning circuitry 270, image buffer 258 and interface 278 while coordinating with the scan drive 262 to perform image capture cycling as previously described.

Although as illustrated, the read initiate button 260 is attached to both the image processor 256 and the scan drive circuitry 262, in an alternate embodiment, the read initiate button 260 is only attached to the image processor 256. Therein, the image processor 256 continues to drive the scan coil 264 via the scan drive circuitry 262 continuously during scan cycling so long as the read initiate button 260 is depressed. In either embodiment, at the initiation of a capture cycle, it is expected that the user would direct the image capture unit 202 toward the target 224 so that the read would result in collection of images that would include a coded image, such as a bar code. The laser drive 266 is initiated by the image processor 256 to cause the laser diode 268 to emit a laser beam that the scan coil 264 causes to be scanned across a target.

Signal conditioning circuitry 270 receives an electrical signal from the photo detector 272 that represents the reflected light intensity received by the photo detector 272 during a sweep of the target. The circuitry 270 squares and saturates the signal received from the photo detector 272 for delivery to the image processor 256 as a received image for proximity screening. If the received image passes proximity screening, the image processor 256 identifies the image as a "coded image" and stores it in the image buffer 258. The image capturing processing continues until a predetermined number of images have been captured by the photo detector 272. Thereafter, the image processor 256 delivers an interrupt signal to the host unit 254 via the interface circuitry 278.

The interrupt issued to the host unit 254 is a maskable interrupt that allows the host processor 280 to execute its other functions and to service the image capture unit 252 only when it has sufficient available processing time. As was previously described, the host processor 280 has additional functions to perform besides the decoding of images produced by the image capture unit 202. Many of these functions, for example, such as communication over the wireless link, may require real time, dedicated participation by the host processor 280. Such real time functions may require (or greatly benefit from) completion before the host unit 254 turns its attention to decode processing of the awaiting coded images. Thus, by using the maskable interrupt, the image capture unit 252 will not gain direct access to the host unit 254 unless the host processor 280 unmasks the interrupt.

The prior art devices dedicated the host processor 280 to decode functions during simultaneous capture and decode cycles. Because the image capture unit 252 obtained images much less quickly than a normal decode time, the host processor 280 waited for the images to arrive. Thus, the host processor 280 was underutilized and dedicated at the same time. Such usage of the host processor 280 not only wasted processing time but wasted power as well. Because the system of the present invention does not enable the host processor 280 to decode images unless it is available and unless the images are fully available, the system 250 of the present invention conserves energy as well as processing capability.

When the image capture unit 252 manages to interrupt the host unit 254, the host processor 280 executes a routine to decode the plurality of images stored in the image buffer 258. Even after being interrupted, the host processor 280 can still chooses to either:1) fully respond by retrieving and decoding the images stored in the image buffer 258; 2) partially respond by retrieving and storing the images in the memory 286 for decode processing at a more convenient time; or 3) delay responding at all until a more convenient time. Thus, the host processor 280 can delay processing by masking the interrupt, delaying image retrieval or delaying decode processing and any combinations thereof.

Although only a maskable interrupt configuration is illustrated, in an alternative design, the host unit 250 could be configured to poll the image capture unit 252. Therein, when the host unit 250 is ready to perform decode processing, the host unit 250 polls the capture unit 252 to see if decode processing is needed. If so, the capture unit 252 will deliver the buffered images via the interfaces 278 and 292 for decode processing.

In the illustrated embodiment, the host processor 280 signals a user through an audible or visual feedback so that the user knows that a successful decode has been performed. Similarly, if a successful decode has not been performed by the host processor 280 for the images received from the image buffer 258, the host processor 280 signals to the user through the image processor 256 and/or reinitiates a capture cycle via the image processor 256.

The system 250 provides many important features that reduce the power consumption of the system 250. Further, because the host unit 254 is not dedicated to decoding during a capture cycle, the host processor 280 may accomplish other functions required of the host unit 254 during the execution of a capture cycle. Thus, the system 250 not only reduces power consumption, but also proves more efficient at managing multiple processing tasks including decode processing.

When the host unit 254 enters a sleep mode, the host processor 280 and conventional hardware 288 are placed in a low power consuming state. Upon receiving an interrupt from the capture unit 252, the host unit 254 only wakes those portions thereof that are required to perform decode processing, e.g., the host processor 280.

In an operation of the scan drive 262 and the laser drive 266 for one dimensional bar code scanning embodiments, the laser beam is swept from a starting sweep point (typically a leftmost location) to an ending sweep point (typically a rightmost location). The angle of this sweep is typically between ten and twenty degrees. Positional feedback is provided from the scan drive 262 to the image processor 256 for correlation with the squared and saturated image data received from the signal conditioning circuitry 270. In an alternative embodiment, the image capture unit 202 employs an array of charge coupled devices (CCD) as the photo detector 272 to capture the entire (1 or 2 dimensional) image of the target. As such, the scan drive circuitry 266 is not needed, and a flash illuminator replaces the laser drive 266 and laser diode 268.

Figure 3:
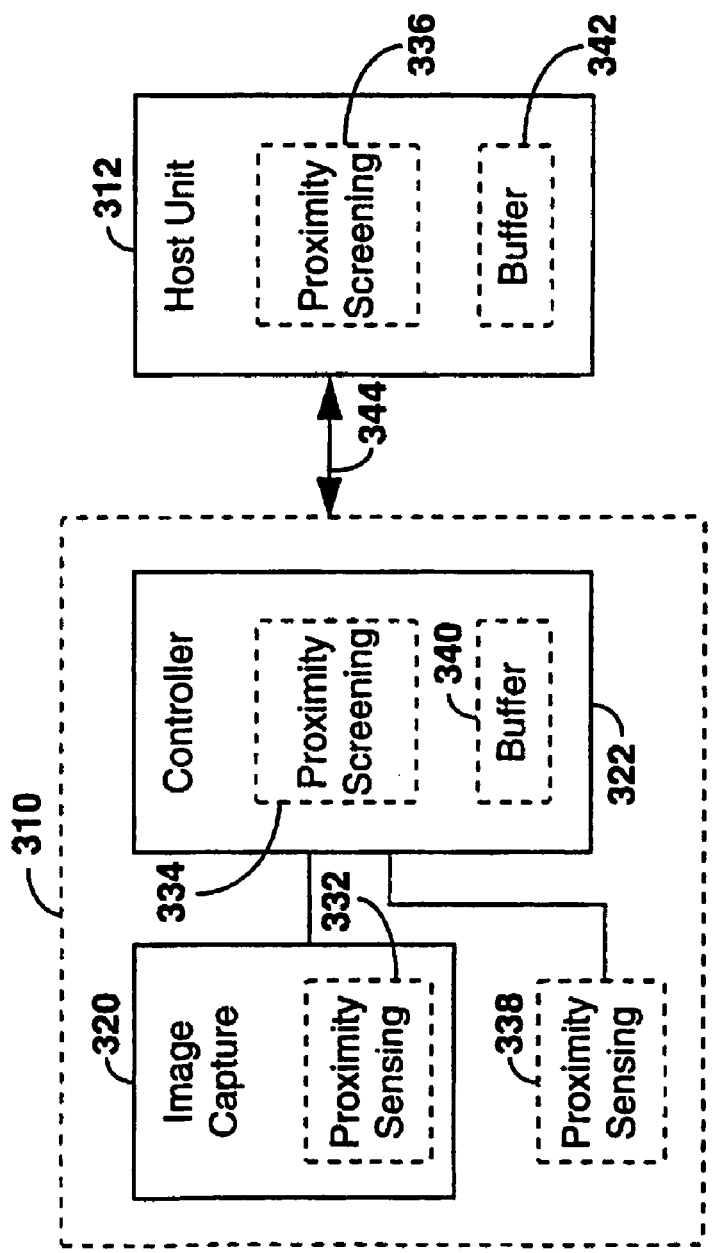
FIG. 3 is a block diagram illustrating several of the various possible design variations which might be made to the coded image capture and processing system of the present invention.

FIG. 3 is a schematic block diagram which illustrates several of the possible variations in the design of the present invention. Even though FIG. 3 is by no means a disclosure of all possible variations, it should illustrate to one of ordinary skill in the art the types of variations that might be made without sacrificing the goals associated with the present invention. In particular, an image capture unit 310 (comprising a controller 322 and image capture circuitry 320) interfaces with a host unit 312 as described previously with a few possible exceptions. First, proximity functionality can be located within the image capture circuitry 320, controller 322, independent circuitry 338 or host unit 312. Moreover, the proximity functionality may be subdivided for coordinated operation at more than one of such locations. For example, all proximity screening could be performed by the controller 322 as represented by the dashed block 334. As such, the image capture circuitry 320 would deliver all images captured to the controller 322 for all proximity screening. Alternately, the image capture unit 310 could take on part the proximity functionality by incorporating proximity sensing within the image capture circuitry 320 or in additional independent circuitry 338. Such proximity sensing involves the use of an independent photodetector to gauge proximity based on reflected light strength in the circuitry 338, or the shared use of a single photodetector found within the image capture circuitry 320 as indicated by the circuitry 338. Similarly, proximity screening functionality (in part or in its entirety) might be moved within the host unit 312 as represented by a block 336.

Additional design variations are also possible. For example, instead of using an independent image buffer (as previously described), the controller 322 selected might include the image buffer therein, i.e., a buffer 340. Alternately, the image buffer might be placed within the host unit 312. In this latter configuration, although the host unit 312 must be available to receive and buffer images as soon as the controller 322 has processed them, a processor within the host unit 312 need not be interrupted by each image if the buffer 342 is directly associated with the communication link between the units 310 and 312. In other words, the overall benefits associated with not requiring a processor within the host unit 312 to operate in a dedicated mode can be realized no matter where the image buffer (or buffering functionality) happens to be placed.

In addition, although each entire image may be stored in the image buffer awaiting decode processing by a processor within the host unit 312 (as previously described), the images can be stored in a compressed form by using image correlation. Specifically, in one embodiment, the controller 322 stores a first of a set of screened coded images (i.e., a reference image) in its entirety within an image buffer. Thereafter, each of the set of screened coded images are compared to the first (reference) image and only the relative differences from the first image is stored. By storing only the differences, it may be determined that all of the plurality of images received are identical and only a single image need be decoded by the host unit 312. By selectively passing only differences along with the reference image to the host unit 312, the processing requirements of the host unit 312 and the burden on the communication link 344 are reduced. This technique also reduces the power consumption of the host unit 312. The integration of proximity functionality accomplishes similar benefits.

Figure 4:
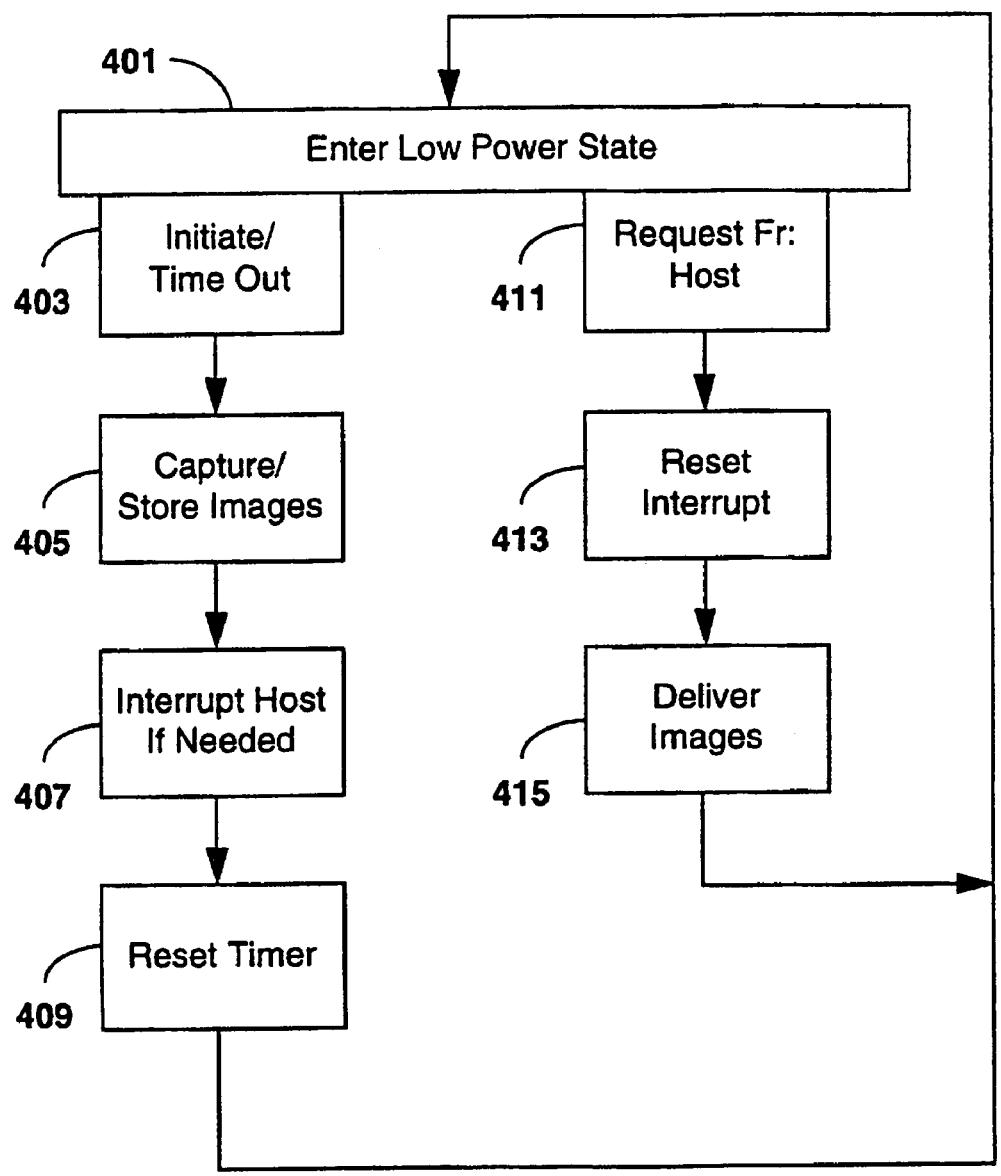
FIG. 4 is a flow diagram which illustrates the basic functionality of the image capture units of FIGS. 1A–F.

FIG. 4 is a flow diagram which illustrates the basic functionality of the image capture units of FIGS. 1A–F. The image capture unit waits in an idle or low power state at block 401 until it receives an indication to begin capture cycling as indicated at a block 403. Thereafter, the image capture unit responds at a block 405 by capturing, proximity screening and storing a set of images. If more than one image has been stored at the block 405, the image capture unit interrupts the host unit at a block 407, sets an interval timer at a block 409, and returns to the idle state at the block 401. If one or less images have been stored during the capture cycle at the block 405, the image capture unit concludes that the capture cycle was a failure and resets the interval timer at the block 409 and returns to the idle state 401.

Having completed the first capture cycle (involving the attempted capture of a predetermined number of images), the image capture unit waits in the idle state at the block 401 for either the host unit's response (to retrieve the buffered images) or the time out of the interval timer (signifying that another set of images needs to be captured). In particular, if the interval timer times out as indicated at the event block 403, the capture unit responds by performing another capture cycle via the blocks 405–409 and returns to the idle state at the block 401. This process of performing a series of capture cycles each separated by an interval time period is termed "capture cycling" herein.

When the host unit responds to an interrupt delivered in the block 407 as represented by a block 411, the image capture unit responds by resetting the interrupt (if need be) at a block 413, delivers the buffered images to the host unit at a block 415 and returns to the idle state at the block 401. The process of capture cycling and servicing the responding host unit continues until the image capture unit receives an indication to terminate capture cycling. As previously described, such an indication may be delivered in a variety of ways such as through a user's release of a depressed button or through the host unit's terminate signal, for example.

FIGS. 5a–c are flow diagrams which illustrate three embodiments of the many possible ways that the capture cycle of the block 405 in FIG. 4 can be carried out. Other embodiments will become apparent to one of ordinary skill in the art with reference to these three.

In FIG. 5a, a capture cycle involves the capture of "N" images which are screened for proximity with only proximate images being buffered. Specifically, at a block 501 the image capture unit sets a counter to a count of "N", captures an image at the block 503, and decrements the counter at the block 505. Thereafter, the capture unit applies proximity screening and checks to see if N has been decremented to zero at a block 507. Four conditions are possible at the decision block 507. First, if the image does not pass proximity screening and N is greater than zero, the image capture unit branches back to cycle through the blocks 503, 505 and 507 to capture and screen another image. Second, if N happens to be zero at the block 507 (indicating that the predetermined number of images has been captured) and proximity screening has failed, the image capture unit ends the capture cycle. Third, if N is zero and proximity screening has succeeded, the image capture unit branches to store the image in the image buffer at a block 509. Thereafter, the image capture unit encounters a decision block 511, and because N is zero, the image capture unit completes the capture cycle and returns to further processing as illustrated in FIG. 4. Fourth, if N is not zero at the block 507 and the image passes proximity screening, the image capture unit also branches to store the image in the image buffer at the block 509. Thereafter, at the block 511, because N is not zero, the image capture unit returns to the block 503 to capture, screen and process another image. Overall, following this flow diagram, the image capture unit captures N images, screens them, and stores successfully screened images in the image buffer.

FIG. 5b illustrates an second alternative embodiment of a single capture cycle shown in FIG. 5a. At a block 521, N is set to a predetermined value corresponding to the number of images to be stored during a capture cycle. Thereafter, the image capture unit repeats blocks 523 and 525 until a proximate image is identified. Once identified, the proximate image is stored and N is decremented at blocks 529 and 527, respectively. This process continues until N proximate images are stored as determined at a block 531. Thereafter, the single capture cycle ends.

FIG. 5c is a flow diagram which illustrates a third embodiment which illustrates the use of proximity screening techniques prior to the actual capturing of images. Such techniques might, as previously described, constitute the detection of a proximate object based on the strength of a received reflection, for example. Particularly, after setting the number of proximate images to be captured at a block 541, the image capture unit continually attempts to detect a proximate image at a block 543. Once detected, the image is captured and stored at blocks 545 and 549, and N is decremented at block 547. This process continues until N images determined to be proximate have been captured. Thereafter, at a block 551, the capture unit decides to end the capture cycle.

Alternately, proximity detection at block 543 may be removed. Doing so will produce an image capture cycle that captures N images whether they are proximate or not. Similar modifications can be made to FIGS. 5a and 5b with similar results. Of course other modifications are also possible. For example, in storing the images, only the first image can be stored as a reference image in its entirety with only the differences of the N−1 other images being stored, as previously described.

Figure 6A:
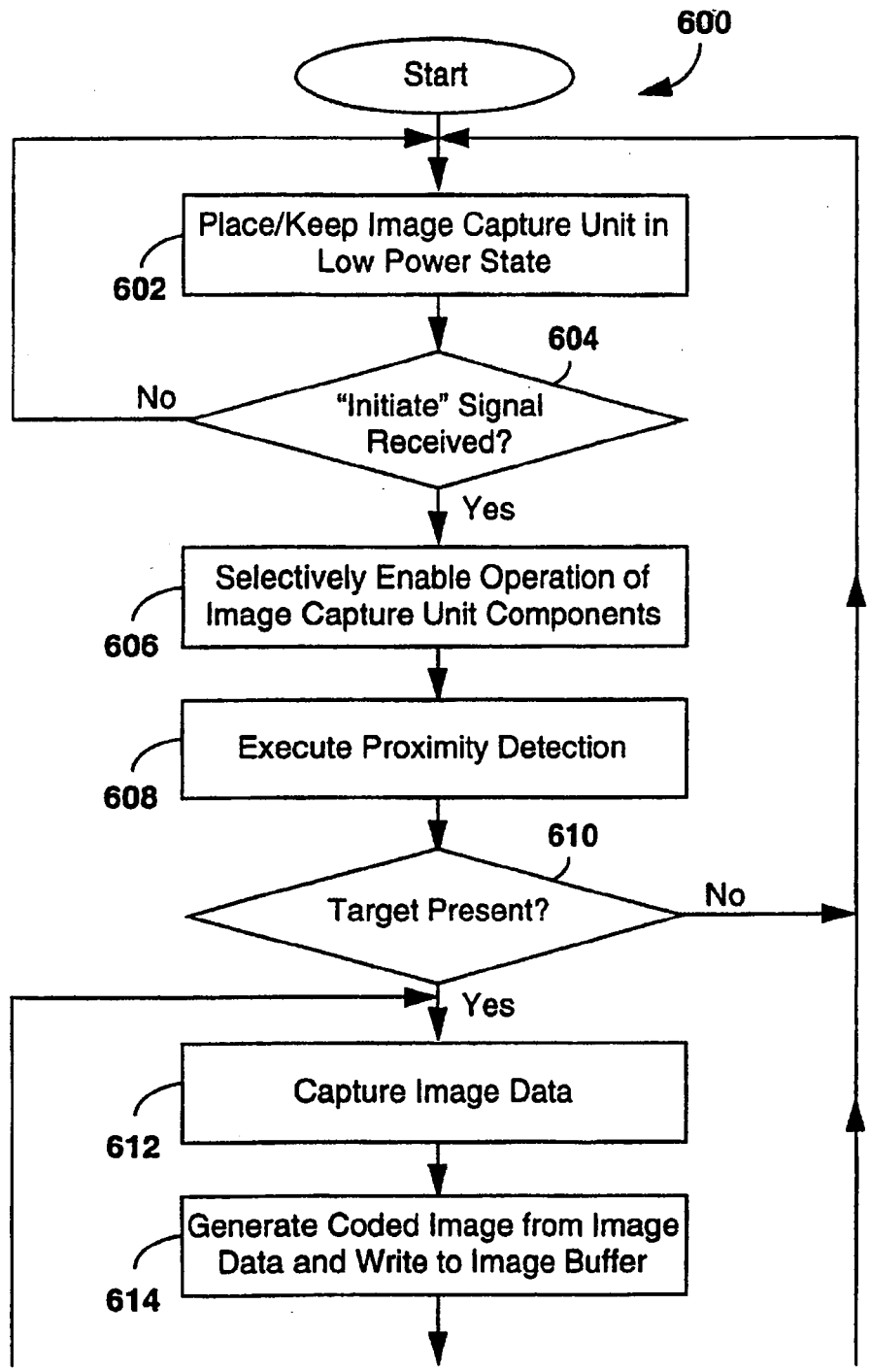
FIGS. 6A and 6B are flow diagrams representing another embodiment of the present invention that illustrate the operation of an image capture unit.
Figure 6B:
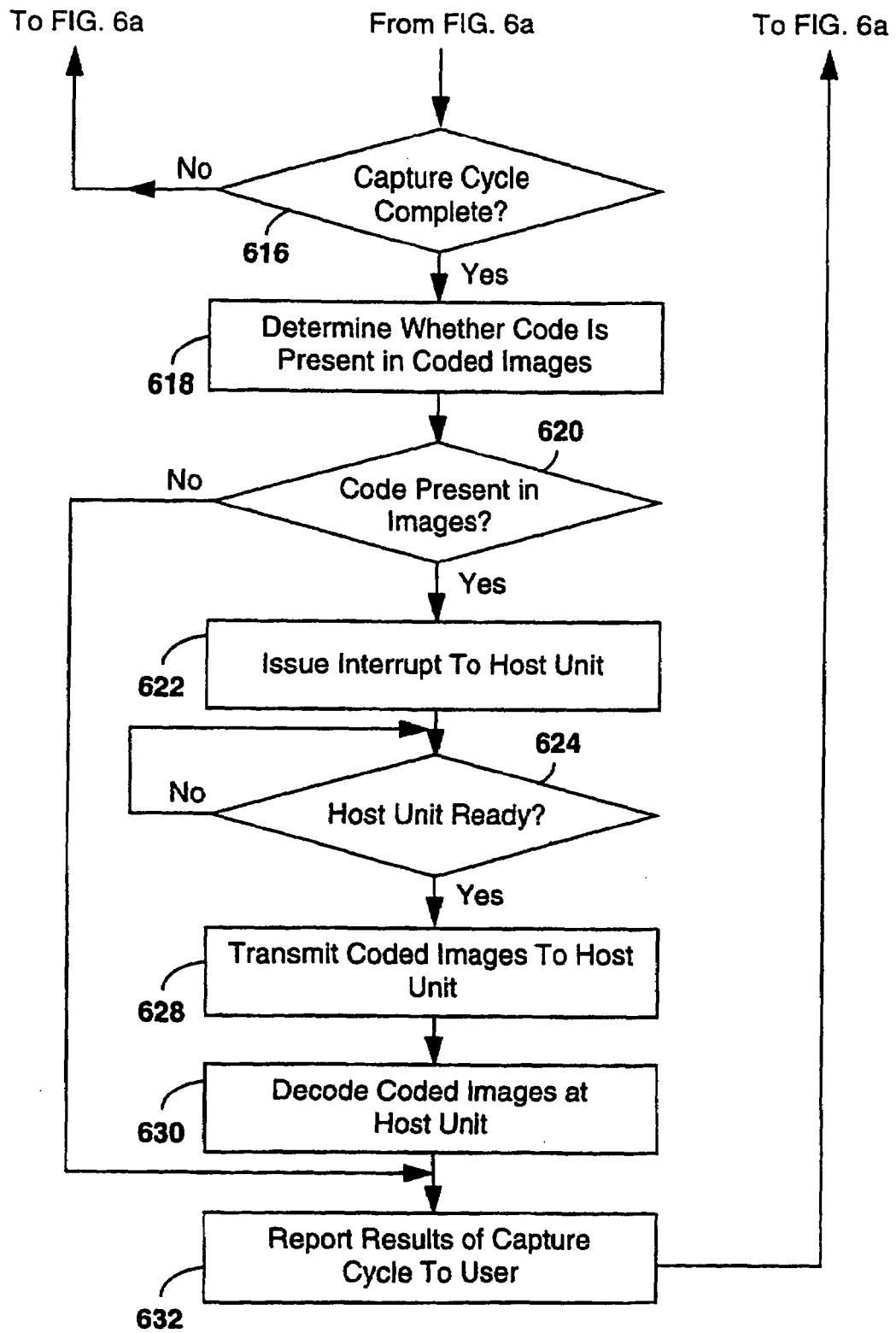

FIGS. 6A and 6B are flow diagrams representing another embodiment of the present invention that illustrate the operation of an image capture unit. In this embodiment, at a block 602, the image capture unit enters and remains in a low power state until an initiate read signal has been asserted at a block 604. Once the initiate read signal has been asserted, the image capture unit branches to a block 606 to selectively enable the operation of image capture unit components. For example, in reference to FIG. 2b, the capture unit might respond to an initiate read signal received from the button 260 by enabling operation of the scan drive 262 and image processor 256, which, in turn (as will be described), enables the laser drive 266 and signal conditioning circuitry 270.

The coil 264 associated with the scan drive 262, as was previously discussed, consumes a significant quantity of current when it first starts up. However, when the coil 264 associated with the scan drive 262 has already been started up, it requires a significantly lower amount of current to continue its operation through the capture cycle. Thus, depending on the specific implementation, the scan drive 262 may operate continuously until the initiate read signal has been removed by release of the button 260.

At a block 608, the image capture unit performs proximity detection. Proximity detection may require that only the scan drive 262, the laser drive 266 and the signal conditioning circuitry 270 be enabled along with a proximity detector. At a block 610, the image capture unit determined whether a valid target is present and within the range. If no target is present, the image capture unit 252 is again placed in a low power state at the block 602 to wait for another read initiate signal. However, in an variation of this embodiment, instead of returning to the block 602, the image capture unit branches after waiting a short duration to the block 608 after unsuccessfully identifying a target at the block 610 to reattempt proximity detection at the block 608.

From the block 610, if a target is present, the image capture unit captures an image at the block 612. Referring back to FIG. 2b, the capture process may include, for example, sweeping the laser beam across the target, and, at the same time, receiving reflected light with the photo detector 272. At a block 614, the image capture unit stores the image to the image buffer. Afterwards, the image capture unit proceeds to a block 616 to determine whether a capture cycle has been completed. Depending on the configuration, the capture cycle may terminate: 1) after a fixed period of time; 2) when the initiate signal has been released; 3) after a valid image has been decoded; 4) after a fixed number of proximate images have been stored; and/or 5) after a fixed number of images have been captured.

Upon completing the capture cycle, the image capture unit branches to a block 618 further proximity screening is applied to determine whether at least potential code images are present. The proximity screening at the block 618 may constitute, for example, looking at the number of transitions in each of the coded images 320 stored in the image buffer. Alternately, for example, the image capture unit may accomplish the screening at the block 618 may also be accomplished by comparing a reference image to the plurality of other images written to the image buffer. If substantial differences exist amongst the images, the image capture unit may conclude that a valid code probably does not exit in the stored set of images. No matter what the technique used for screening in the block 620, if the images pass the test, the image capture unit branches to interrupt the host unit at a block 622. Otherwise, the image capture unit branches to a block 632 to report the fact that capturing cycling is ongoing and returns to the block 602 to begin another capture cycle (so long as the initiate read signal is still applied).

After interrupting the host, the capture unit enters a wait state at a block 624 for the host to respond. Although not shown, a time out period is also initiated which, upon time out, the image capture unit branches to the block 602 to begin another capture cycle. If the host unit responds, the image capture unit transmits the stored coded images to the host unit for decoding. As represented by a block 630, the host processor decodes the images to produce a resultant code or to determine that no resultant code exists. Then, at a block 632, the user is either notified of the success or notified that capture cycling is ongoing. From the block 632, the image capture unit returns to the block 602 to begin another capture cycle. However, in an alternate configuration, upon detecting a valid code, the host unit causes the image capture unit to ignore the initiate read signal until the button is retriggered. As can be appreciated, operation pursuant to the illustrated embodiment utilizes object proximity to initiate the image capturing and decoding process while employing a read initiate signal from a button, for example, to enable object proximity processing.

Thus, the flow of operations of the embodiment illustrated in FIGS. 6A and 6B enable the capture systems of the present invention to operate in reduced power modes and reduced processing requirement modes. In this fashion, capture may be performed in a manner to reduce the consumption of power from a finite energy power supply such as a battery and also free up the operation of the host processors performance various other functions.

Figure 7A:
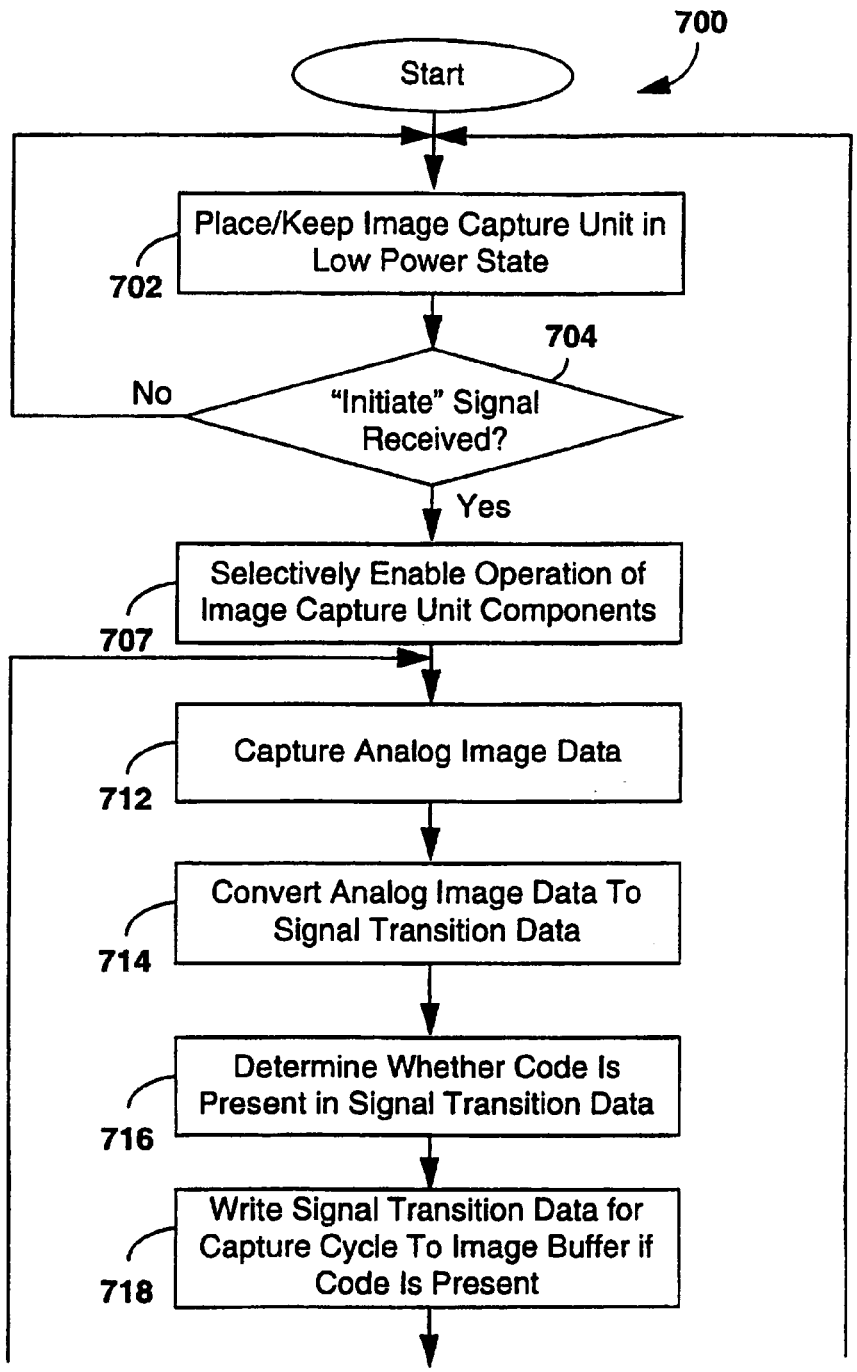
FIGS. 7A and 7B illustrate an alternative method or flow of operation of the systems of the present invention.
Figure 7B:
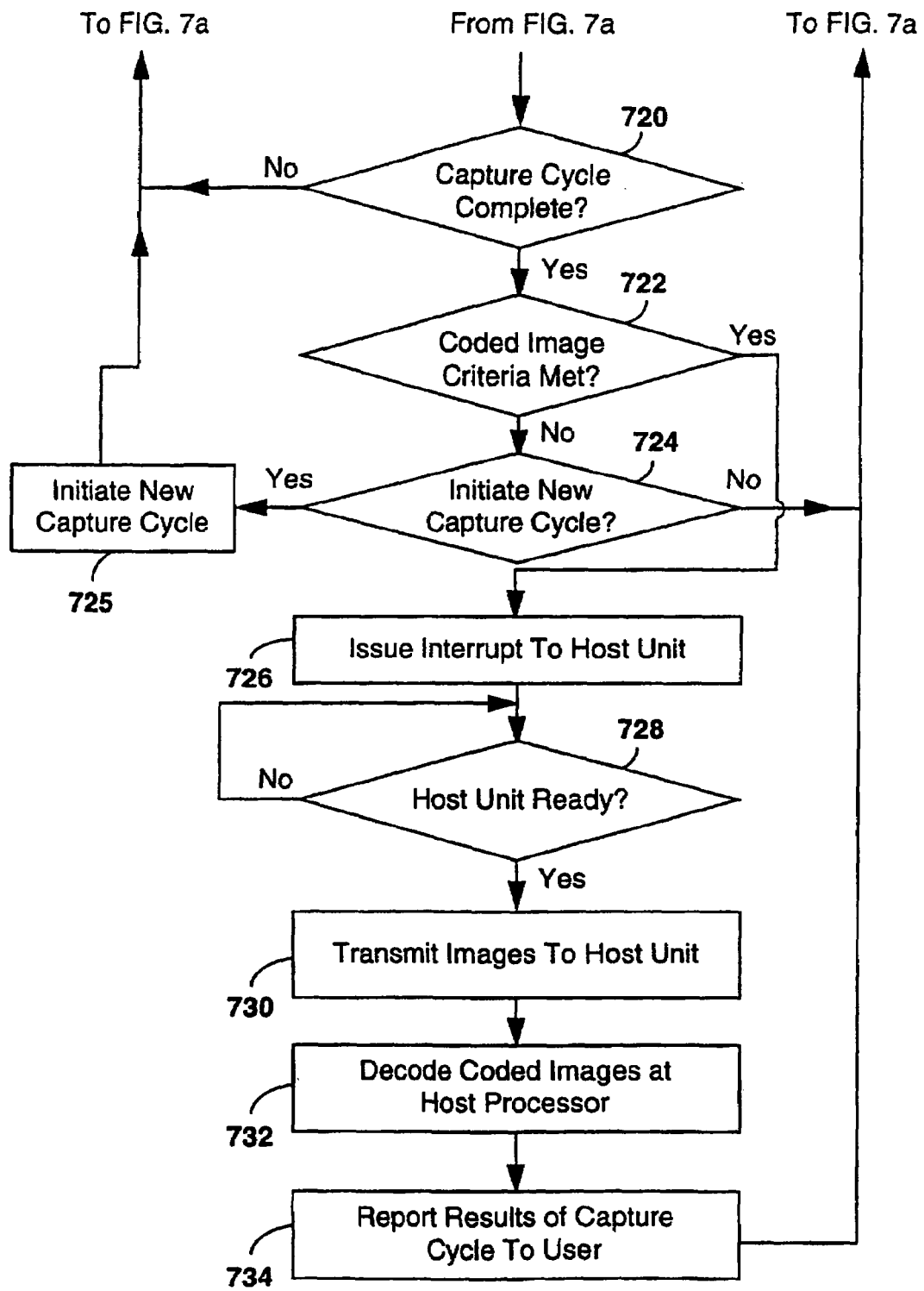

FIGS. 7A and 7B illustrate an alternative method or flow of operation of the systems of the present invention. The blocks identified in FIGS. 7A and 7B having names and/or descriptions similar or identical to corresponding blocks found in FIGS. 6A and 6B have similar or identical function. In particular, an image capture unit enters a low power state at a block 702 awaiting an initiate read signal at a block 704. If not busy, the host unit may also be in a low power state at this time to conserve battery life. Otherwise, the host unit may be engaged in servicing other hardware or software that may or may not benefit from real time dedicated processing by a host processor in the host unit.

When an initiate read signal has been received, the image capture unit branches to a block 707. At the block 707, the image capture unit selectively enables the operation of its components to accomplish the operation found in the further blocks. In accordance with previously described concepts and goals, only those components required are activated when needed. Thus, the block 707 is merely illustrative of actual enabling scope, sequence and timing. Thereafter, at a block 712, the image capture unit executes a read of the target, capturing an analog representation of the image. The image capture unit converts the analog representation into digital signal transition data at a block 714. The digital signal transition data constitutes a series of transition point markers that include a time stamp identifying the transition and the relative time of the transition occurrence. In another embodiment, instead of using a time stamp, the transition point markers identify each transition by identifying interval duration information.

Although a conversion to transition data is not necessary, the amount of data required to represent each captured image can be significantly reduced. Further reductions are achieved by only recording a reference image and differences found in each subsequent image (as previously described). By reducing the amount of data required, memory size and thus power is reduced. Also, the volume of data to be transferred from the image capture unit to the host processor is reduced. This not only reduces traffic on the communication link, but minimizes power utilization and speeds up the transfer time. Further, the processing requirements to decode images stored in a fashion where transition points are only considered will reduce the amount of host processing time required.

At a block 716, the image capture unit analyzes the digital signal transition data to determine whether the digital signal transition data constitutes a coded image. Although many proximity screening techniques may be employed (as previously discussed), in the present embodiment such a determination is made by counting the number of transitions existing in the digital signal transition data. If a code image is present in the data, the image capture unit will write the digital signal transition data to the image buffer at a block 718. Otherwise, the image capture unit ignores the transition data, considering it a non-code image. In either case, the image capture unit branches to a block 720 to determine whether the capture cycle is complete. If the capture cycle has been configured to constitute a fixed number of reads and that number has not been reached, the image capture unit will branch back to the block 712 to perform another read. Similarly, if the capture cycle has been configured to constitute a fixed number of stored images and that number has not been reached, the image capture unit will branch back to the block 712 to attempt to store another. In either configuration, once completed, the image capture unit branches to a block 722.

At the block 722, the image capture unit determines whether a code image criteria is met. In particular, to determine whether the stored images are suitable for decoding by the host unit 204, if valid code images exist in more than a predetermined number (at least one) of the stored images, the code image criteria is met. However, if the criteria were not met, flow would proceed to a block 724 wherein the capture unit determines whether another capture cycle is to be initiated or not. Factors considered at block 724 include proximity of a target (in some embodiments employing object proximity), whether a read initiate button 260 is still depressed, setup configurations and/or various other factors that would indicate whether additional capture may be desirable.

However, if code image criteria is met at the block 722, the image capture unit branches to perform the operations indicated by blocks 726 through 734. The blocks 726–34 correspond to the blocks 624–32 of FIG. 6B, respectively. Thus, these blocks need not be further discussed.

Figure 8:
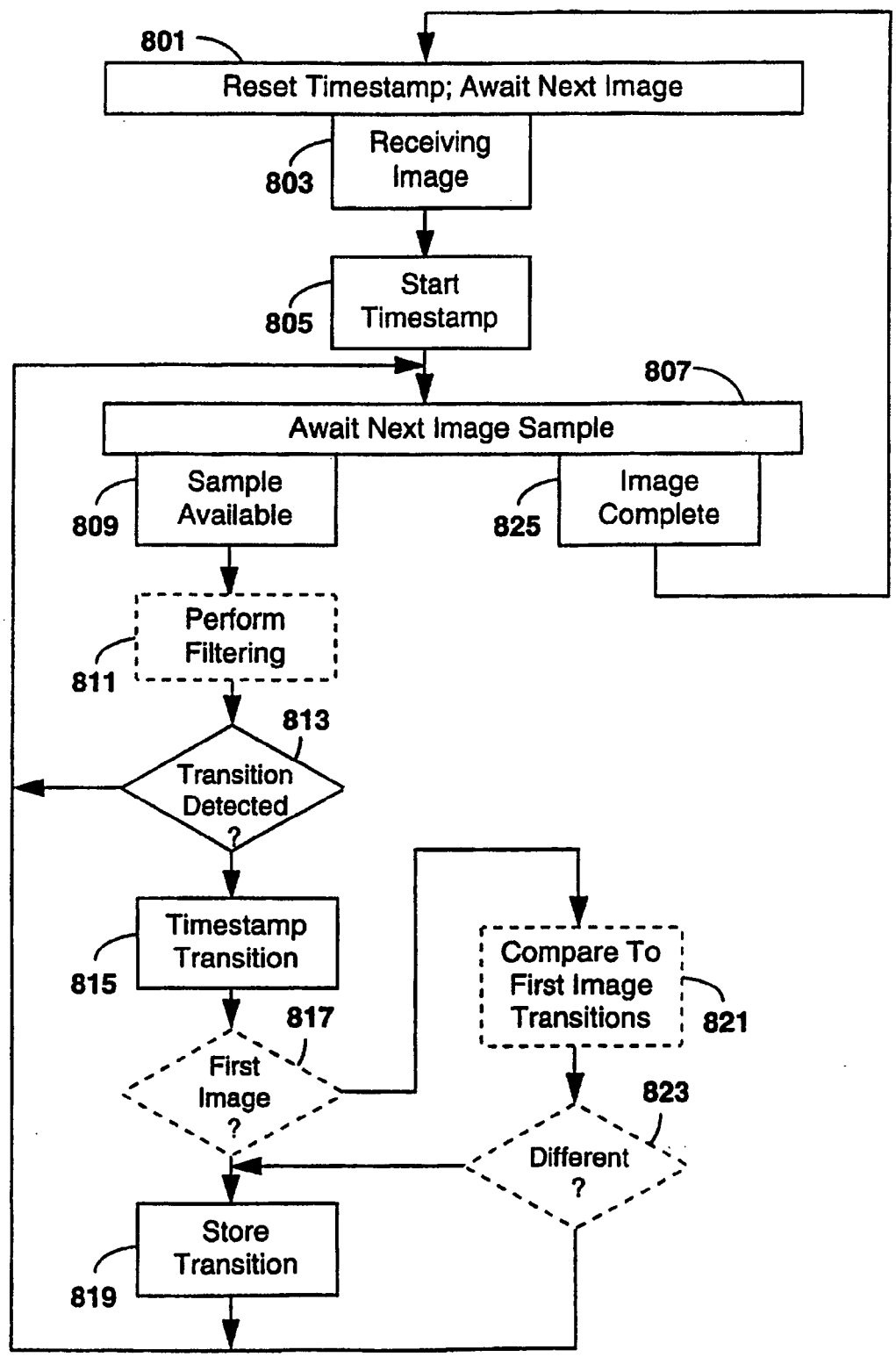
FIG. 8 is a flow diagram that illustrates another embodiment of the functionality an image processor of the image capture unit in processing captured image data.

FIG. 8 is a flow diagram that illustrates another embodiment of the functionality an image processor of the image capture unit in processing captured image data. At a block 801, the image processor waits to begin receiving image data from an optical unit of the image capture unit via real time sampling of reflected image signals representing a coded image. Upon beginning to receive the image data (i.e., upon receiving or retrieving the first sample thereof), the image processor vectors at an event block 803 to start a time stamp timer 805. Afterwards, at a block 807, the image processor waits for the next sample of the image being captured. Once the image processor has the next sample, as represented by the event block 809, the image processor considers all transitions in recent image samples and performs filtering at a block 811 of transitions which appear to constitute noise. In other embodiments, the block 811 is not implemented, placing all noise filtering responsibilities on the host unit. Either way, at a block 813, the image processor considers the newly received sample to determine whether it constitutes a transition, i.e., from white to black or black to white, for example, as represented in the reflected image data representative of the coded image.

If a transition is not detected, the image processor returns to the block 807 to await another image sample. In this way, by cycling through the blocks 807, 809, 811 and 813, the image processor sifts through samples that do not constitute a legitimate transition event. If the block 811 is not employed, the image processor would still sift through the image samples to find transition events, but would occasionally, inappropriately identify the dirt, scratch or image defect as a legitimate transition. Many occurrences of dirt, scratches or defects can be filtered by considering the expected transition rate with the rate caused by the occurrence. Even so, some such occurrences will still often appear to be legitimate transitions and escape filtering. The capturing of multiple images when, for example, the user's aim changes slightly allows some of the images to avoid such occurrences in the image data.

When a transition is detected at the block 813, the image processor branches to a block 815 to record a time stamp as indicated by a time stamp timer. At a block 817, if this is the first captured image of the predetermined number to be captured during a capture cycle, the image processor stores the transition in an image buffer at a block 819, and returns to the block 807 to process another image sample. In this manner, the entire set of transitions for the first image captured will be stored in the image buffer by cycling through the blocks 807–19.

Once an entire image is processed, upon returning to the block 807, the image processor vectors through an event block 825 to return to the block 801 to reset the time stamp timer and await the processing of another image. When that image begins to be received, the image processor performs the functionality identified from the blocks 805–17 as previously described. However, because a first or reference image has been stored already (in the form of transition data), at the block 817 the image processor branches to a block 821 to compare the current transition information with the corresponding reference image transition. If the current transition information is different as indicated at a block 823, the image processor stores the transition at the block 819. If the transition information is the same, the image processor will not store the transition and returns to the block 807 to process the next sample. Thus, all subsequent images are processed the same way that the first image is handled with the exception that duplicate data is not stored.

Although in the preceding embodiment, the image processor operates to process the image data as it is captured, the entire flow diagram illustrated could also be processed after the fact by the image processor through retrieval of previously stored image data samples. Similarly, instead of waiting for receipt of real-time samples, the image processor might also be used participate to take the samples. Moreover, other techniques for identifying differences between images such us through various correlation techniques might be employed as an alternative.

Figure 9:
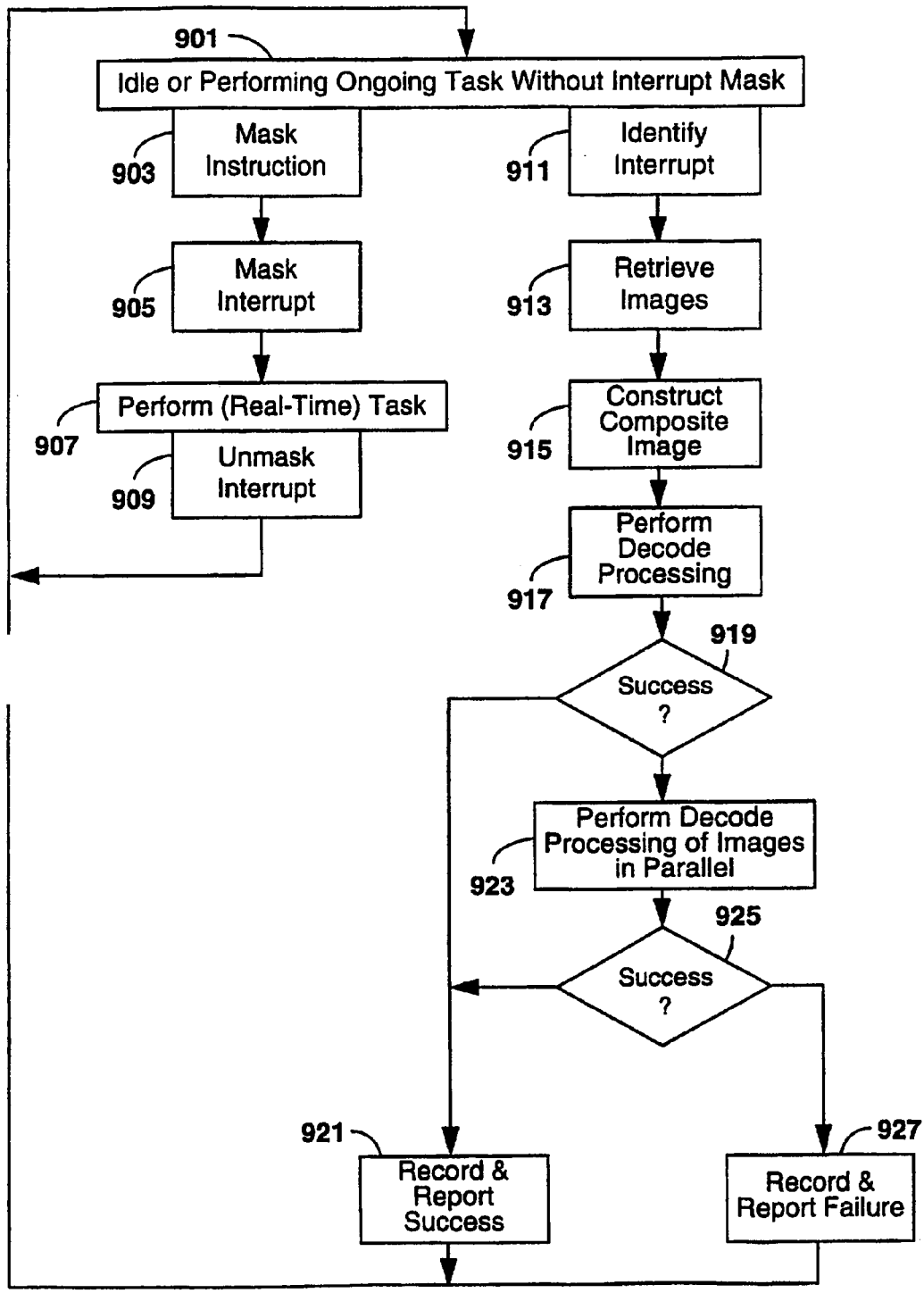
FIG. 9 is a flow diagram illustrating the detailed operation of a host processor in one embodiment of the present invention employing interrupt masking techniques to isolate itself from the image capture unit when other tasks prove more important.

FIG. 9 is a flow diagram illustrating the detailed operation of a host processor in one embodiment of the present invention employing interrupt masking techniques to isolate itself from the image capture unit when other tasks prove more important. Specifically, at a block 901 the host processor operates as any typical processor in a computing device, performing conventional processing tasks as the need arises. If a task benefits from the dedicated attention of the host processor, the host processor can be directed by associated task specific software to mask interrupts received from the image capture unit. Afterwards, when the task no longer needs dedicated attention, the interrupt is unmasked and the host returns to the idle or processing state at the block 901. This process is represented by the event blocks 903, 905, 907 and 909.

When the interrupt is not masked and an interrupt from the capture unit is received as illustrated by an event block 911, the host processor vectors to retrieve images from the image capture unit at a block 913. From the retrieved images, the host processor constructs a composite image at a block 915. To construct the composite image, the host processor first attempts to identify the most common transition sequence from all of the transitions of each image retrieved, discarding less common differences. In particular, transitions found in at least two thirds of the retrieved images are placed in the composite image. Any conflicting transitions in the other third of the retrieved images are not used in the composite image. Next, the host processor attempts to reconcile conflicts which cannot be resolved by a two thirds majority. Corresponding transitions having different time stamp information are reconciled by averaging the location of the time stamp for a transition added to the composite signal. Where transitions are present in some images but not in others (but neither controlling two thirds majority), a simple majority governs whether a transition will be added to the composite image or not. Other weighting factors and composite construction rules may supplement, modify or replace the aforementioned rules as proves beneficial.

After constructing the composite image at the block 915, the host processor attempts to decode the composite image at a block 917. If the attempt proves successful, as determined at a block 919, the host processor stores and/or forwards the decoded information for further processing and reports the success to the user at a block 921. Afterwards, the host processor returns to its idle or ongoing processing state at the block 901. By attempting to decode a composite image, the host processor is often more likely to decode the target image where no single capture of the image alone would have proven successful. For example, with very dirty or heavily scratched one-dimensional targets, each captured image might only provide an accurate representation of a portion of the overall code information originally recorded on the target. Subsequent captured images might also only correctly capture a portion. However, if the valid portions combined constitute a whole image, decoding can prove successful. This is often the case where capture cycling takes place while the unsteady nature of a human hand changes the code reading systems relationship to the a target.

If the attempt to decode the composite image fails at the block 919, the host processor branches to the block 923 to attempt to decode all of the retrieved images (i.e., all of the sets of transition information) simultaneously in parallel. Doing so saves a great deal of time over conventional serial processing techniques, because common areas of each of the retrieved images need only be decoded once. If only one of the parallel transition paths proves decodable (i.e., if only one successful decode result is produced), at a block 925 the host processor branches to block 921 to report and record the success before returning to the idle/processing state at the block 901. If two of the parallel transition paths proves decodable (i.e., if two or more successful decodes yield more than one result), the host processor, depending on the configuration of the host unit, either records and reports a failure at the block 927 or offers the choices to the user. A rejection by the user of all of the choices causes the host processor to branch to the block 927. Selection of one of the choices causes the host processor to branch to the block 921. In either case, the processor records and reports the result and branches back to the idle/processing state at the block 901.

Figure 10:
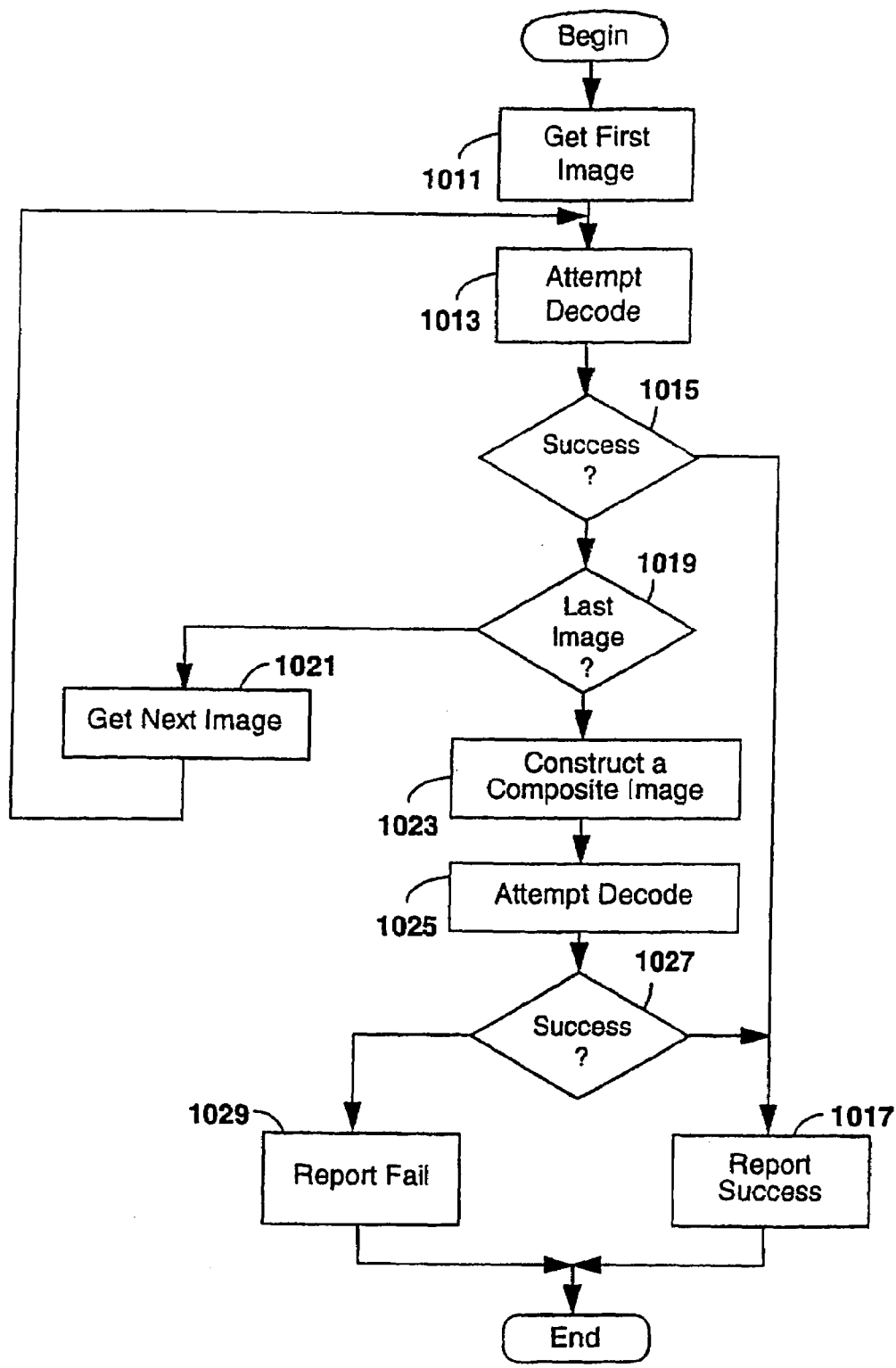
FIG. 10 is a flow diagram illustrating an alternate embodiment where the host processor attempts to construct and decode a composite image only after attempting to decode each of the images retrieved from the image capture unit. A host processor first retrieves all of the transition information stored by the image capture device during a capture cycle.

FIG. 10 is a flow diagram illustrating an alternate embodiment where the host processor attempts to construct and decode a composite image only after attempting to decode each of the images retrieved from the image capture unit. A host processor first retrieves all of the transition information stored by the image capture device during a capture cycle. Thereafter, at blocks 1011 and 1013, the host processor accesses the first image and attempts decode processing. If the image is decoded, the host processor branches to a block 1017 to report the success and ends further decode processing. However, if the first image is not decoded, from a block 1015 the host processor branches to a block 1019 to consider whether there are any more images that have not received an attempt at decode processing. If other images are available, the host processor branches to get the next image at 1021 and attempt decode processing as before via the boxes 1015–19. This cycling repeats until either one image is decoded, ending the process, or no more images are available.

If no more images are available and no successful decode has been achieved, the host processor branches to blocks 1023 and 1025 to construct and attempt to decode a composite image (as previously described in reference to FIG. 9). The host processor reports success or failure in the attempt to decode the composite image at the blocks 1017 or 1029, respectively, and ends decode processing of the retrieved images.

Figure 11:
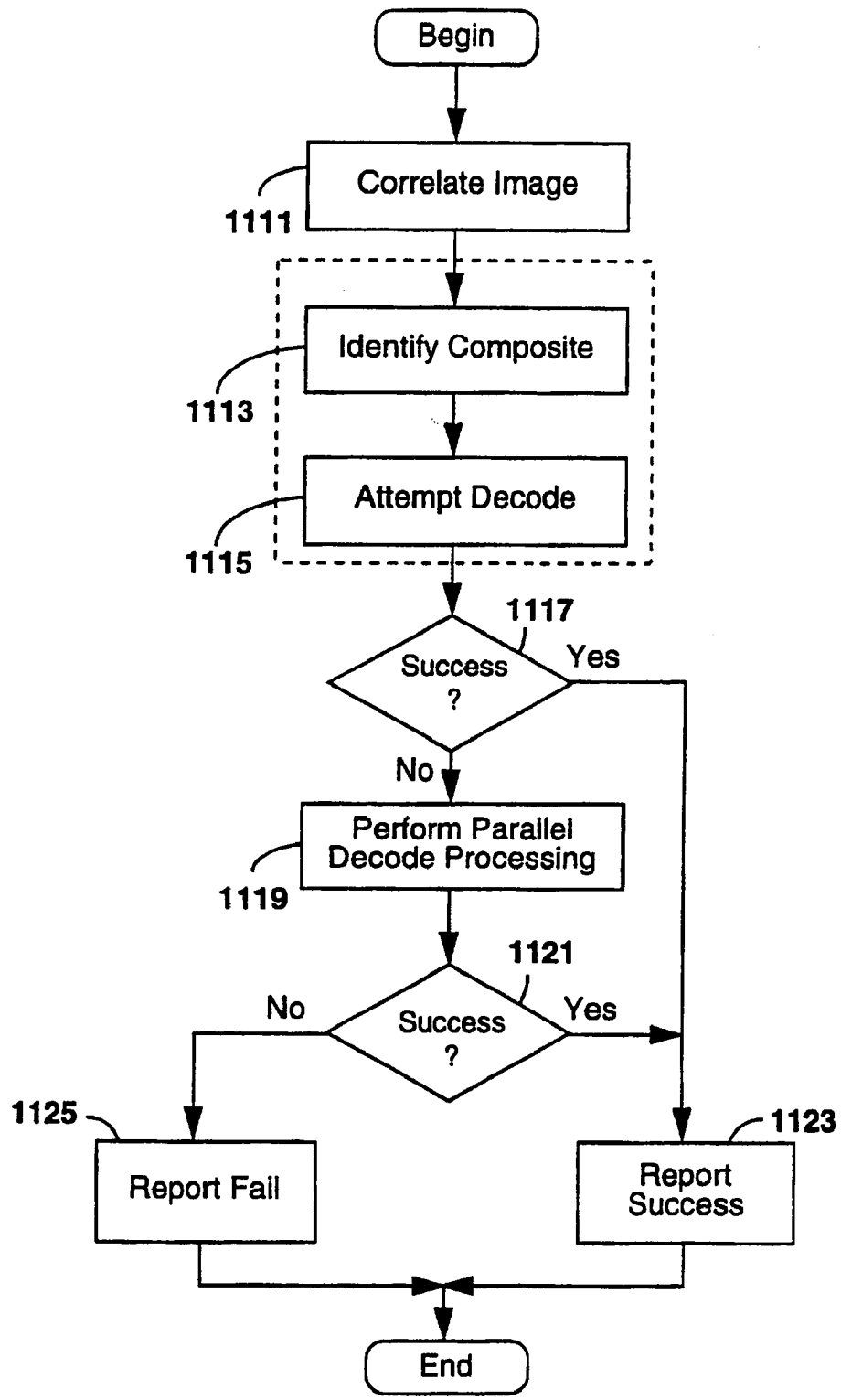
FIG. 11 illustrates a further embodiment of the operation of a host processor in decoding images retrieved from an image capture unit, wherein an attempt at parallel decode processing is only attempted after an attempt to decode a composite signal fails.

FIG. 11 illustrates a further embodiment of the operation of a host processor in decoding images retrieved from an image capture unit, wherein an attempt at parallel decode processing is only attempted after an attempt to decode a composite signal fails. Together, FIGS. 9–11 illustrate that many other variations involving one or more of serial, parallel and composite decode processing are also possible.

More particularly, in FIG. 11, the host processor attempts to construct and decode a composite image at blocks 1111–15. Thereafter, if the attempt fails, the host processor attempts parallel decode processing at a block 1119. If either attempt proves successful, the host processor reports the success at a block 1123 before ending the process. Similarly, if both decode attempts fail, the host processor reports the failure at a block 1125 before ending.

Figure 12:
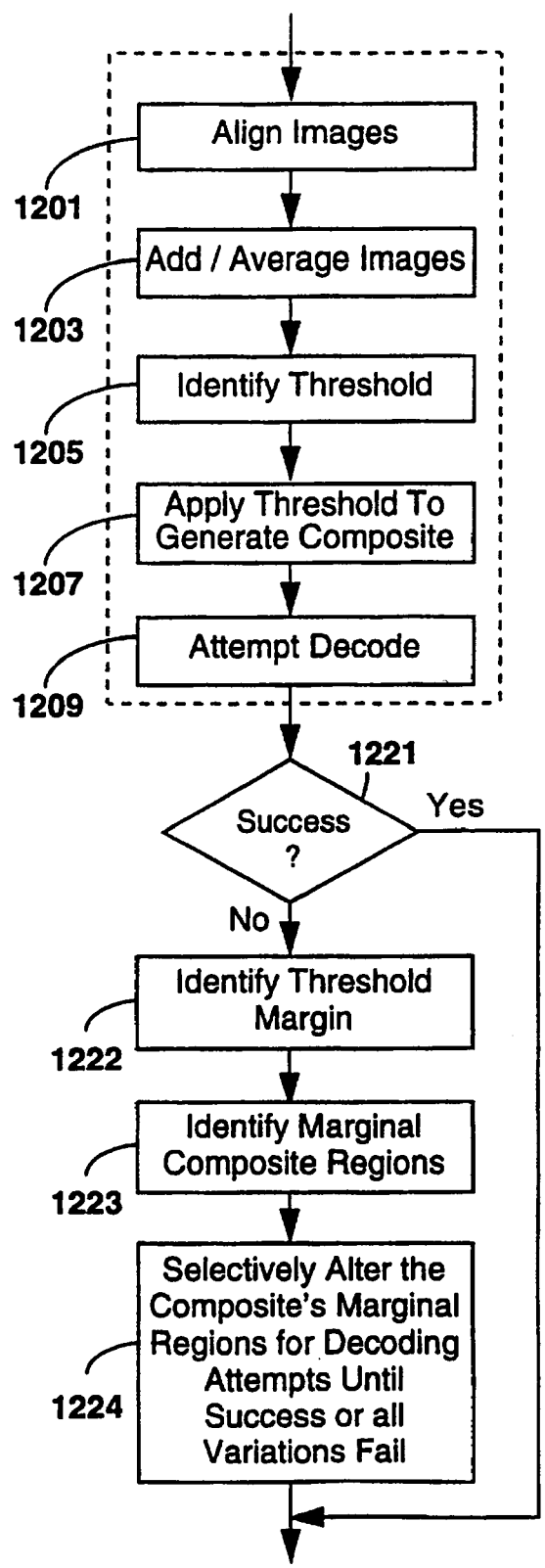
FIG. 12 is a flow diagram illustrating another method for constructing a composite signal by averaging all images retrieved from the image capture unit before attempting to decode.

FIG. 12 is a flow diagram illustrating another method for constructing a composite signal by averaging all images retrieved from the image capture unit before attempting to decode. At a block 1201, the host processor first aligns the images:1) through correlation techniques such that images which are incomplete are appropriately aligned with other of the retrieved images; and 2) by scaling images if need be so that images gathered further away can be combined with those gathered closer to the image capture unit (e.g., while the user moves the code reading system toward a target during a capture cycle). Thereafter, at a block 1203, the host processor averages the sum of all of the retrieved images. As a result, the average image will appear somewhat analog in nature, and not merely represent white or black image elements. Instead the average image will constitute a gray-scale image.

At a block 1205, the host unit calculates a threshold value equaling fifty percent of the maximum possible amplitude of the gray-scale image. The calculated threshold is then applied to the gray-scale image to generate a black and white image, i.e., the composite image, at a block 1207. Specifically, any gray-scale level greater than the threshold is considered white, while the remainder is considered black.

With such a composite image, the host processor attempts decode processing at a block 1209. If successful, the processing terminates. Otherwise, the host processor branches to a block 1222 to identify a threshold margin, which is calculated to be ten percent of the maximum possible amplitude of the gray-scale image. At a block 1223, the host processor subtracts the threshold margin from the threshold then reattempts to generate the composite signal from the gray-scale image using as a threshold the previously calculated fifty percent threshold less the ten percent margin. Similarly, at the block 1223, the host processor reattempts to generate the composite signal from the gray-scale image using the fifty percent threshold plus the ten percent margin. With both reattempts compared to the original composite, the host processor identifies all differences at a block 1223. In other words, the host processor identifies all marginal regions.

By selectively altering the original composite image with some or all of the plurality of marginal differences, at a block 1224, the host processor attempts decode processing. Such attempts actually constitute a series of attempts wherein each attempt involves an alteration of the original composite image by inserting one or more of the plurality of marginal differences therein. This process continues until either a successful decode is achieved or all reasonable variations fail.

Although a ten percent margin with a fifty percent original threshold is disclosed, other percentages might also be adopted. Moreover, instead of using a marginal percentage value, the host processor might merely identify as marginal regions those sections of the gray-scale image that are closest to the threshold at the block 1223. Other similar techniques might also be employed.

Although the use of the term "processor" herein may refer to a single, processing component such as a microprocessor, it is meant to also include processing circuitry comprising multiple components that coordinate to carry out the underlying processing functionality described herein.

The above described preferred embodiments are intended to illustrate the principles of the invention, but not to limit the scope of the invention. Various other embodiments and modifications to these preferred embodiments may be made by those skilled in the art without departing from the scope of the following claims.

The invention claimed is:

1. A coded image capture and decoding system comprising:
   (a) an optical system that captures image data from coded targets, so as to generate a plurality of image data groups each representing information concerning coded target as a whole;
   (b) a first processing system, coupled to the optical system, that supplies a plurality undecoded images each based on one of the image data groups received from the optical system, so that said plurality of undecoded images each represents information concerning a coded target as a whole;
   (c) an image buffer, coupled to the first processing system, that stores said plurality undecoded images generated by the first processing circuit; and
   (d) a non-dedicated second processing system, for coupling to the image buffer, that, after said plurality of undecoded images each representing information concerning a coded target as a whole, are stored in the image buffer, after a notification to the non-dedicated second processing system of the presence of said plurality of undecoded images in the image buffer, and with the non-dedicated second processing system having the plurality of undecoded images available at a time for processing, attempts decode processing of said plurality of undecoded images;
   wherein said non-dedicated second processing system selectively attempts decade processing of each of said plurality of undecoded images in succession, while the optical system may be in a power saving state until expiration of a time interval before resuming image capture operation.

2. A coded image capture and decoding system comprising:
   (a) an optical system that captures image data from coded targets, so as to generate a plurality of image data groups each representing information concerning a coded target as a whole;
   (b) a first processing system, coupled to the optical system, that supplies a plurality of undecoded images each based on one of the image data groups received from the optical system, so that said plurality of undecoded images each represents information concerning a coded target as a whole;
   (c) an image buffer, coupled to the first processing system, that stores said plurality of undecoded images generated by the first processing circuit; and
   (d) a non-dedicated second processing system, for coupling to the image buffer, that, after said plurality of undecoded images each representing information concerning a coded target as a whole, are stored in the buffer, after a notification to the non-dedicated second processing system of the presence of said plurality of undecoded images in the image buffer, and with the non-dedicated second processing system having the plurality of undecoded images available at a time for processing, attempts decode processing of said plurality of undecoded images;
   wherein said non-dedicated second processing system upon successful decoding of any one of the plurality of undecoded images ignores notification of a further plurality of undecoded images being in the image buffer where such further plurality of undecoded images may be of the same coded target from which an undecoded image has just been successfully decoded.

3. The method of processing optically read two-dimensional code images from a two-dimensional code of a two-dimensional coded target, said method comprising
   (a) assembling in an image buffer a plurality of undecoded two-dimensional code images each representing information concerning the same two-dimensional code as a whole;
   (b) after assembly of the plurality of undecoded two-dimensional code images in the image buffer, signaling a non-dedicated processor capable of reading the two-dimensional code, to process the information in the image buffer; and
   (c) the non-dedicated processor, after receipt of a signal that a plurality of undecoded two-dimensional code images are assembled in the image buffer, at a time selected by the non-dedicated processor, carrying out a decode processing which selectively includes processing of all of the plurality of undecoded two-dimensional code images in the image buffer;
   wherein at least five two-dimensional images are read from the same two-dimensional code of the two-dimensional coded target before the non-dedicated processor is signaled to process the information in the image buffer; and
   wherein the at least five two-dimensional images read from the same two-dimensional code are screened and only two-dimensional images meeting the screening requirements are assembled in the image buffer, the non-dedicated processor not being signaled if less than two undecoded images have been assembled in the image buffer after screening of the at least five two-dimensional images.

4. A coded image capture and decoding system comprising:
   (a) a code capture system that has a field of view encompassing a complete optical code configuration so as to read optical information from a complete optical code configuration to be decoded, said code capture system generating sets of undecoded data from a plurality of optical readings of the same optical code configuration; and (b) a processing system for receiving sets of undecoded data based on a plurality of optical readings of the same optical code configuration;

(c) said processing system thereby having available for decoding the received sets of undecoded data from a plurality of optical readings of the same code configuration and being operative to effect a decoding process that comprises utilizing the received sets of undecoded data from more than one optical reading of the same code configuration, to provide decoding of such code configuration;

wherein the code capture system comprises a screening system for evaluating the sets of undecoded data as generated by the code capture system, and transmits to the processing system those sets of undecoded data that appear to represent a valid optical code configuration only if more than one set of undecoded data appears to represent a valid optical code configuration.

5. A coded image capture and decoding system comprising:

(a) a code capture system that has a field of view encompassing a complete optical code configuration so as to read optical information from a complete optical code configuration to be decoded, said code capture system generating sets of undecoded data from a plurality of optical readings of the same optical code configuration; and (b) a processing system for receiving sets of undecoded data based on a plurality of optical readings of the same optical code configuration;

(c) said processing system thereby having available for decoding the received sets of undecoded data from a plurality of optical readings of the same code configuration and being operative to effect a decoding process that comprises utilizing the received sets of undecoded data from more than one optical reading of the same code configuration, to provide decoding of such code configuration;

wherein the code capture system comprises a screening system for evaluating the sets of undecoded data as generated by the code capture system, and transmits to the processing system those sets of undecoded data that appear to represent a valid optical code configuration only if more than one set of undecoded data appears to represent a valid optical code configuration, and only when the processing system has completed higher priority processing operations.

6. A coded image capture and decoding system comprising:

(a) a code capture system that has a field of view encompassing a complete optical code configuration so as to read optical information from a complete optical code configuration to be decoded, said code capture system generating sets of undecoded data from a plurality of optical readings of the same optical code configuration; and (b) a processing system for receiving sets of undecoded data based on a plurality of optical readings of the same optical code configuration;

(c) said processing system thereby having available for decoding the received sets of undecoded data from a plurality of optical readings of the same code configuration and being operative to effect a decoding process that comprises utilizing the received sets of undecoded data from more than one optical reading of the same code configuration, to provide decoding of such code configuration;

wherein the code capture system comprises a screening system operative to apply a screening process for evaluating the sets of undecoded data as generated by the code capture system, said screening system transmitting to the processing system only those sets of undecoded data that appear to represent a valid optical code configuration, said screening process comprising comparing the similarity of the plurality of sets of undecoded data.

* * * * *